United States Patent
Mech et al.

(10) Patent No.: US 9,292,941 B2
(45) Date of Patent: Mar. 22, 2016

(54) METHODS AND APPARATUS FOR SPECIFYING AND INTERPOLATING HIERARCHICAL PROCEDURAL MODELS

(75) Inventors: Radomir Mech, Mountain View, CA (US); Jerry O. Talton, III, Stanford, CA (US)

(73) Assignee: Adobe Systems Incorporated, San Jose, CA (US)

( * ) Notice: Subject to any disclaimer, the term of this patent is extended or adjusted under 35 U.S.C. 154(b) by 694 days.

(21) Appl. No.: 12/857,382

(22) Filed: Aug. 16, 2010

(65) Prior Publication Data

US 2013/0120392 A1     May 16, 2013

Related U.S. Application Data

(60) Provisional application No. 61/240,140, filed on Sep. 4, 2009.

(51) Int. Cl.
    *G06T 11/00*      (2006.01)

(52) U.S. Cl.
    CPC ................... *G06T 11/001* (2013.01)

(58) Field of Classification Search
    USPC ........................................................ 345/441
    See application file for complete search history.

(56) References Cited

U.S. PATENT DOCUMENTS

| | | | | |
|---|---|---|---|---|
| 4,729,098 | A * | 3/1988 | Cline et al. | 345/421 |
| 5,475,766 | A * | 12/1995 | Tsuchiya et al. | 382/144 |
| 5,900,880 | A * | 5/1999 | Cline et al. | 345/423 |
| 6,441,823 | B1 * | 8/2002 | Ananya | 345/442 |
| 6,762,769 | B2 * | 7/2004 | Guo et al. | 345/582 |
| 6,919,903 | B2 * | 7/2005 | Freeman et al. | 345/582 |
| 6,937,275 | B2 | 8/2005 | Heiles | |
| 6,964,025 | B2 | 11/2005 | Angiulo et al. | |
| 6,982,710 | B2 * | 1/2006 | Salomie | 345/420 |
| 6,987,535 | B1 | 1/2006 | Matsugu et al. | |
| 7,012,624 | B2 | 3/2006 | Zhu et al. | |
| 7,069,506 | B2 | 6/2006 | Rosenholtz et al. | |
| 7,136,072 | B2 * | 11/2006 | Ritter | 345/588 |
| 7,239,314 | B2 | 7/2007 | Johnston | |
| 7,257,261 | B2 | 8/2007 | Suh | |

(Continued)

OTHER PUBLICATIONS

Hertzman, Curve Analogies, Thirteenth Eurographics Workshop on Rendering—2002.*

(Continued)

*Primary Examiner* — Mark Zimmerman
*Assistant Examiner* — Vu Nguyen
(74) *Attorney, Agent, or Firm* — Wolfe-SBMC

(57) ABSTRACT

Methods and apparatus for procedural modeling are described for generating procedural models and exploring procedural model space. Common procedural components (models, modules, and methods) and a hierarchical framework are described that may be used to construct hierarchical procedural models. A model may comprise a hierarchy of one or more modules. Each module includes a sequence of methods and an optional geometry for display. A method may be controlled by one or more parameters. The values of the parameters may be specified via curves. A module description may be condensed into a single array of values for parameters of the module. Thus, a model or module may be specified by filling in values for arrays of parameters for the sequence of methods. An interpolation technique for interpolating between models is described in which models are matched according to a cost function so that ancestry is preserved.

20 Claims, 13 Drawing Sheets

(56) References Cited

U.S. PATENT DOCUMENTS

| | | | |
|---|---|---|---|
| 7,283,140 B2 * | 10/2007 | Zhou et al. | 345/582 |
| 7,418,673 B2 | 8/2008 | Oh | |
| 7,538,764 B2 * | 5/2009 | Salomie | 345/420 |
| 7,577,313 B1 | 8/2009 | Georgiev | |
| 7,596,751 B2 | 9/2009 | Rowson et al. | |
| 7,800,627 B2 * | 9/2010 | Zhou et al. | 345/582 |
| 8,249,365 B1 | 8/2012 | Winnemoeller et al. | |
| 8,280,703 B1 * | 10/2012 | Mech | 703/2 |
| 2005/0012746 A1 * | 1/2005 | Chen et al. | 345/441 |
| 2006/0267958 A1 | 11/2006 | Kolmykov-Zotov et al. | |
| 2006/0285762 A1 * | 12/2006 | Sun et al. | 382/254 |
| 2007/0288876 A1 * | 12/2007 | Irmatov et al. | 716/7 |
| 2008/0097630 A1 * | 4/2008 | Weatherhead et al. | 700/86 |
| 2008/0143726 A1 * | 6/2008 | Lee et al. | 345/442 |
| 2009/0127322 A1 * | 5/2009 | Miller | 229/87.19 |
| 2009/0303235 A1 * | 12/2009 | Maekawa et al. | 345/423 |
| 2010/0191364 A1 * | 7/2010 | Goldman | 700/137 |
| 2010/0220099 A1 * | 9/2010 | Maekawa et al. | 345/419 |

OTHER PUBLICATIONS

Prusinkiewicz P., James M., Mech R.; Synthetic topiary. In Proceedings of ACM SIGGRAPH 1994, pp. 351-358.

Wong M. T., Zongker D. E., Salesin D. H.; Computer-generated floral ornament. In Proceedings of SIGGRAPH 1998, pp. 423-434.

Parish Y. I. H., Muller P.; Procedural modeling of cities. In Proceedings of ACM SIGGRAPH 2001, pp. 301-308.

Wonka P., Wmmer M., Sillion F., Ribarsky W.; Instant architecture. ACM Trans. Graph.,22 (2003), 3, pp. 669-677.

Muller P., Wonka P., Haegler S., Ulmer A., Gool L.V.: Procedural modeling of buildings. ACM Trans. Graph., 25(2006) 3, pp. 614-623.

Deussen O. and Lintermann, B.: Interactive Modeling of Plants. IEEE Computer Graphics and Applications, 19 (1999), 1, pp. 56-65.

Esch G., Wonka P., Muller P., Zhang E.: Interactive procedural street modeling, SIGGRAPH 2007 Sketches.

U.S. Appl. No. 12/858,558, filed Aug. 18, 2010, Holger Winnemoeller.

U.S. Appl. No. 13/219,457, filed Aug. 26, 2011, Stephen J Diverdi.

U.S. Appl. No. 13/565,552, filed Aug. 2, 2012, Elya Shechtman.

Chen, X., Neubert, B., Xu, Y.-Q., Deussen, O., and Kang, S. B. 2008. Sketch-based tree modeling using markov random field. ACM Trans. on Graphics 27, pp. 5, 1-9.

Turk G.: Texture Synthesis on Surfaces. In Proceedings of SIGGRAPH 2001, pp. 347-354.

Ashikhmin, M.: Synthesizing Natural Textures. In Proceedings of the Symposium on Interactive 3D Graphics 2001, pp. 217-226.

Hertzmann, A., Jacobs, C.E. Oliver, N., Curless, B., Salesin, D.H.: Image Analogies. In Proceedings of SIGGRAPH 2001, pp. 327-340.

Prusinkiewicz, Przemyslaw; Lindenmayer, Aristid (1990). The Algorithmic Beauty of Plants. Springer-Verlag. Chapter 4, pp. 101-107. ISBN 978-0387972978.

Deussen O., Hiller S., Van Overveld C., Strothotte T.: Floating points: A method for computing stipple drawings. Computer Graphics Forum 19, pp. 1-3 (2000).

Winkenbach G., Salesin D. H.: Computer generated pen-and-ink illustration. In Proceedings of SIGGRAPH 1994, pp. 91-100.

Salisbury M. P., Anderson S. E., Barzel R., Salesin D.H.: Interactive pen-and-ink illustration, In Proceedings of SIGGRAPH 1994, p. 101.

Hertzmann A., Oliver N., Curless B., Seitz S.M.: Curve analogies. In Rendering Techniques 2002: 13th Eurographics Workshop on Rendering, pp. 233-246.

Jodoin P. M., Epstein E., Granger-Piche M., Ostromoukhov V.: Hatching by example: a statistical approach. In Proceedings of NPAR 2002, pp. 29-36.

Lloyd S. P.: Least Squares quantization in pcm. IEEE Trans. on Information Theory 28, 2 (1982), pp. 129-137.

U.S. Appl. No. 12/039,164, filed Feb. 28, 2008, Radomir Mech.

U.S. Appl. No. 13/029,036, filed Feb. 16, 2011, Radomir Mech.

Sims, K. Artificial Evolution for Computer Graphics. Computer Graphics 25, 4 (Aug. 1991), 319-328.

J. Marks, B. Andalman, P.A. Beardsley, and H. Pfister et al. Design Galleries: A General Approach to Setting Parameters for Computer Graphics and Animation. In ACM Computer Graphics (SIGGRAPH '97 Proceedings), pp. 389-400, Aug. 1997.

Igarashi, T. and J.F. Hughes, A Suggestive Interface for 3D Drawing, in Proceedings of the ACM Symposium on User Interface Software and Technology, UIST 01. 2001, ACM: Orlando, Florida.

L. Shapira, A. Shamir, and D. Cohen-Or. Image appearance exploration by model based navigation. In Computer Graphics Forum, Eurographics, 2009. (Mar. 30 to Apr. 3, 2009).

Deco tool and Spray Brush for creating complex, geometric patterns in Flash http://www.adobe.com/devnet/flash/articles/deco_intro.html (has date—Feb. 2, 2009) http://www.adobe.com/devnet/flash/articles/deco_intro_print.html (pdf of the entire article, no date).

Whyte, O., Sivic, J., and Zisserman, A. 2009. Get out of my picture! internet-based inpainting. In BMVC (British Machine Vision Conference), pp. 1-11.

U.S. Appl. No. 12/868,519, filed Aug. 25, 2010, Elya Shechtman, et al.

U.S. Appl. No. 12/857,294, filed Aug. 16, 2010, Dan Goldman, et al.

P. Bhat, B. Curless, M. Cohen, and C. L. Zitnick. Fourier analysis of the 2d screened poisson equation for gradient domain problems. In ECCV, 2008, pp. 1-14.

U.S. Appl. No. 12/394,280, filed Feb. 27, 2009, Dan Goldman, et al.

Yonatan Wexler, Eli Shechtman, Michal Irani. Space-Time Completion of Video. IEEE Transactions on Pattern Analysis and Machine Intelligence, vol. 29, No. 3, March 2007, pp. 1-14.

Agarwala, A., Dontcheva, M., Agrawala, M., Drucker, S., Colburn, A., Curless, B., Salesin, D., and Cohen, M. 2004. Interactive digital photomontage. In ACM SIGGRAPH, vol. 23, pp. 294-302.

Arias, P., Facciolo, G., Caselles, V., and Sapiro, G. 2011. A variational framework for exemplar-based image inpainting. IJCV 93 (July), pp. 319-347.

U.S. Appl. No. 12/315,038, filed Nov. 26, 2008, Dan Goldman, et al.

Burt, P. J., and Adelson, E. H. 1983. A multiresolution spline with application to image mosaics. ACM Trans. Graphics 2 (October), pp. 217-236.

Efros, A. A., and Leung, T. K. 1999. Texture synthesis by non-parametric sampling. IEEE Computer Society, Los Alamitos, CA, USA, pp. 1-6.

Fang, H., and Hart, J. C. 2007. Detail preserving shape deformation in image editing. In ACM SIGGRAPH, vol. 26, pp. 1-5.

Hays, J., and Efros, A. A. 2007. Scene completion using millions of photographs. In ACM SIGGRAPH, vol. 26, 4:1-4: pp. 1-7.

Kwatra, V., Essa, I., Bobick, A., and Kwatra, N. 2005. Texture optimization for example-based synthesis. In ACM SIGGRAPH, vol. 24, pp. 795-802.

Kwatra, V., Sch¨odl, A., Essa, I., Turk, G., and Bobick, A. 2003. Graphcut textures: image and video synthesis using graph cuts. In ACM SIGGRAPH, vol. 22, pp. 277-286.

Perez, P., Gangnet, M., and Blake, A. 2003. Poisson image editing. In ACM SIGGRAPH, vol. 22, pp. 313-318.

Rother, C., Bordeaux, L., Hamadi, Y., and Blake, A. 2006. AutoCollage. In ACM SIGGRAPH, vol. 25, pp. 847-852.

Simakov, D., Caspi, Y., Shechtman, E., and Irani, M. 2008. Summarizing visual data using bidirectional similarity. In CVPR, pp. 1-8.

Szeliski, R., and Shum, H.-Y. 1997. Creating full view panoramic image mosaics and environment maps. In ACM SIGGRAPH, pp. 251-258.

Tappen, M., Freeman, W., and Adelson, E. 2005. Recovering intrinsic images from a single image. IEEE Trans. PAMI 27, 9 (sept.), pp. 1459-1472.

Wei, L. Y., and Levoy, M. 2000. Fast texture synthesis using tree-structured vector quantization. In ACM SIGGRAPH, pp. 479-488.

U.S. Appl. No. 12/868,540, filed Aug. 25, 2010, Elya Shechtman, et al.

U.S. Appl. No. 13/565,552, filed Aug. 2, 2012, Elya Shechtman, et al.

Kajiya, J. T. and Kay, T. L. 1989. Rendering fur with three dimensional textures. SIGGRAPH Comput. Graph. 23, (Jul. 3, 1989), pp. 271-280.

Marschner, S. R., Jensen, H. W., Cammarano, M., Worley, S., and Hanrahan, P. 2003. Light scattering from human hair fibers. In ACM

(56) References Cited

OTHER PUBLICATIONS

SIGGRAPH 2003 Papers (San Diego, California, Jul. 27-31, 2003). SIGGRAPH '03. ACM, New York, NY, pp. 780-791.
Barnes, C., Shechtman, E., Finkelstein, A., and Goldman, D. B. 2009. PatchMatch: a randomized correspondence algorithm for structural image editing. In ACM SIGGRAPH 2009 Papers (New Orleans, Louisiana, Aug. 3-7, 2009). H. Hoppe, Ed. SIGGRAPH '09. ACM, New York, NY, pp. 1-11.
Chen, H. and Zhu, S. 2006. A Generative Sketch Model for Human Hair Analysis and Synthesis. IEEE Trans. Pattern Anal. Mach. Intell. 28, (Jul. 7, 2006), pp. 1025-1040.
H. Chen and S. C. Zhu, "A generative model of human hair for hair sketching", CVPR (IEEE Conference on Computer Vision and Pattern Recognition), pp. 74-81, 2005.
David J. Heeger and James R. Bergen. Pyramid-based texture analysis/synthesis. In SIGGRAPH 95, pp. 229-238, 1995.
U.S. Appl. No. 12/858,552, filed Aug. 18, 2010.
Ijiri, T., Owada, S., and Igarashi, T. 2006. The sketch L-system: Global control of tree modeling using free-form strokes. In Smart Graphics, pp. 138-146.
U.S. Appl. No. 12/858,546, filed Aug. 18, 2010, Winnemoeller et al.
U.S. Appl. No. 13/029,036, filed Feb. 16, 2011, Adobe Systems Incorporated, all pages.
U.S. Appl. No. 13/219,848, filed Aug. 26, 2011, Adobe Systems Incorporated, all pages.
O. Deusen et al., "The Elements of Nature: Interactive and Realistic Techniques," ACM SIGGRAPH 2004 Course Note #31, Aug. 2004, pp. 1-64.
Ando, R., & Tsuruno, R. (2010). Vector fluid: A vector graphics depiction of surface flow. In NPAR '10: Proceedings of the 8th International Symposium on Non-photorealistic Animation and Rendering (pp. 129-135). New York, NY, USA: ACM, pp. 1-7.
Ando, R., & Tsuruno, R., Vector graphics depicting marbling flow. In Computers & Graphics, vol. 35, Issue 1, Feb. 2011, pp. 148-159.
Siu Hang Chu, "Making Digital Painting Organic," PhD thesis, Hong Kong University of Science and Technology, Aug. 2007, pp. 1-126.
Tom Van Laerhoven, "An Extensible Simulation Framework Supporting Physically-based Interactive Painting," PhD thesis, University of Limburg, Jun. 21, 2006, pp. 1-171.
Corel, "Corel Painter 11 Features," from the WayBackmachine, May 26, 2011, pp. 1-3.
Corel, "Corel Painter 11 Overview," from the WayBackMachine, May 26, 2010, pp. 1-3.
Chris McVeigh, "ArtRage Studio Pro 3 review", PCWorld, Feb. 12, 2010, pp. 1-4.
Ambient Design, "Artrage 3," http://www.ambientdesign.com/, from web.archive.org, May 25, 2010, ArtRage home page, p. 1.
Marketwire.com release, "Auryn Releases "Auryn Ink" Watercolor App; Named One of the Seven Most Innovative iPad Apps o f 2010 by fast Company," Jan. 4, 2011, pp. 1-2.
giggleapps.com review, "Auryn Ink Review," Feb. 10, 2011, pp. 1-4.
iTunes Preview, "Auryn Inc. Auryn ink," Jul. 20, 2011, downloaded at http://itunes.apple.com/us/app/auryn-Auryn\%20Ink/id407668628, pp. 1-2.
U.S. Appl. No. 13/219,453, filed Aug. 26, 2011, Diverdi et al.
Barla P., Breslav S., Thollot J., Sillion F., Markosian L.; Stroke Pattern Analysis and Synthesis. Computer Graphics Forum, 25 (3), pp. 663-671, 2006.
Muller M., Heidelberger B., Teschner M., Gross M.: Meshless deformations based on shape matching. ACM Transactions on Computer Graphics, 24, 3 (2005), pp. 471-478.
Mech R., Prusinkiewicz P.; Visual models of plants interacting with their environment. In Proceedings of ACM SIGGRH 1996, pp. 397-410.

* cited by examiner

METHODS AND APPARATUS FOR SPECIFYING AND INTERPOLATING HIERARCHICAL PROCEDURAL MODELS

PRIORITY INFORMATION

This application claims benefit of priority of U.S. Provisional Application Ser. No. 61/240,140 entitled "Methods and Apparatus for Specifying and Interpolating Hierarchical Procedural Models" filed Sep. 4, 2009, the content of which is incorporated by reference herein in its entirety.

BACKGROUND

Description of the Related Art

Element arrangements, or patterns, are ubiquitous in both man-made environments (e.g., tiles, building, façades, decorative art, etc.) and in the natural environment (e.g., trees, vines, honeycombs, flowers and flower petals, ballasts, pebble beaches, clouds, etc.). Synthesizing element arrangements or patterns is a useful tool in computer graphics, for example in texture creation and non-photorealistic rendering. Element arrangements have a large variation; some of them may have regular or near-regular features throughout, others are not locally regular but instead distribute irregular features uniformly (irregular uniform).

One technique for synthesizing general patterns is procedural modeling. Procedural modeling techniques deal with an element as a unit module. Procedural modeling systems create complex graphical structures including one or more graphic modules based on a set of rules and a set of parameters for the rules. A procedural modeling system starts from an initial feature, and progressively replaces and adds graphic modules based on local generation rules.

Conventionally, control of procedural models has been limited. Conventional procedural modeling techniques typically require the developer or user to write code or scripts (e.g., code or scripts in Deco, L-systems or some other procedural modeling system) to define the local growth rules, which makes it difficult for novice users to control the resulting model. It is not intuitive to write procedural models even for programmers, and it is generally even more difficult for artists. Interactions with and control of procedural models have conventionally been limited to editing the procedures (e.g., code or scripts written in Deco, L-systems or some other procedural modeling system), or moving sliders or other controls representing parameters of the model. However, the change in behavior is often drastic and it is sometimes not intuitive to see how some parameters affect the resulting structure, particularly complex parameters.

The following is an example of a complex parameter that may be used in a procedural model, and is used to illustrate the problem area of exploring the parameter space for complex parameters:

$$x_i(t) = (1-t)\sin(t) + \frac{t}{\cos(e^{2t+3})}$$

It is often difficult to specify evolution of such complex parameters, for example evolution in time (for animations), and evolution in growth (for static models). Work has been done in the area of exploring the parameter space for a given procedural model, and for exploring the space of the models themselves. For example, there have been efforts to use genetic programming to evolve procedures for generating textures or structures by genetically modifying user-selected candidates in a repeated process. As another example, the parameter space of a single complex procedural model has been explored by clustering commonly appearing parameter sets and interpolating between such groups.

SUMMARY

Various embodiments of methods and apparatus for specifying and interpolating procedural models are described. Embodiments may provide a hierarchical framework for procedural modeling, techniques for constructing hierarchical procedural models, and interpolation methods for exploring procedural model space based on the framework, that address the issues of complexity in procedural modeling. Embodiments may provide common procedural components (procedural models, modules, and procedural methods) and a general, hierarchical framework for procedural modeling. Embodiments may provide a framework and techniques for procedural modeling in which a procedural model may be expressed as a hierarchy of modules. Each module includes a sequence of one or more operation blocks (procedural methods) and an optional geometry for display. A method may be executed at intervals specified by a curve. A method may use one or more curves controlling its parameters. A curve may specify either a two dimensional (2D) value or a one-dimensional (1D) value over time. Some methods can create new modules, thus generating a hierarchy of modules. Thus, embodiments provide a general, hierarchical procedural modeling framework in which each procedural model is a hierarchical collection of modules, every module has a list of one or more sequentially executed procedural methods that modify the module's state, the methods may be linked to curves for parameter input, and at least some modules include a geometry for display.

A module description may be condensed into a single array of values for parameters of the module. In at least some embodiments, the values for at least some parameters may be specified via a graphical user interface representation of a parameter curve; the user may draw or modify a curve on a user interface to indicate the values for a respective parameter. Alternatively, a curve may be specified using some other method. For example, the curve's parameters may be provided in a specification file for a procedural model, or the curve may be created in a different software application, stored in a file, and imported from the file. Thus, code writing may not be necessary; instead, a model or module may be specified by filling in values for arrays of parameters for the sequence of methods.

At least some embodiments may provide a procedural model building technique and graphical user interface via which a user may graphically construct a hierarchical procedural model by combining various pre-existing components, for example components such as methods, modules, or entire procedural models, selected from a procedural model library, and/or by creating new components (methods or modules) for a procedural model. The graphical user interface may also allow the user to draw or otherwise specify curves that represent the values for model parameters. Thus, embodiments may allow a user to construct a hierarchical procedural model according to the procedural modeling hierarchical framework by combining various pre-existing components and/or user-generated components, and by specifying curves that indicate parameter values for the procedural model.

The hierarchical procedural modeling framework may also enable interpolation between existing procedural models to be performed. Interpolation between models may be used, for example, in exploratory procedural modeling. A model description forms a graph in which nodes (modules) may be labeled by the array of methods and their parameters. Embodiments may provide an interpolation technique and a user interface for interpolating between two models in which two hierarchies (trees) of nodes (modules) representing the two models are matched so that the ancestry is preserved; a node above another node stays above the other node, even if a new node is inserted between them. Embodiments may find correspondences between models so that the cost of matching is minimal. To perform interpolation between two procedural models, nodes in the two trees may be matched to identify matching nodes, and interpolation is performed between labels of the matching nodes. To interpolate between two labels, the methods of the associated nodes are aligned, and common parameter curves are interpolated.

While embodiments of the interpolation technique are described in which models are matched so that the ancestry is preserved, the hierarchical procedural modeling framework may also enable interpolation between procedural models to be performed according to other mappings, for example mappings in which the ancestry is not necessarily preserved.

Figure 1:
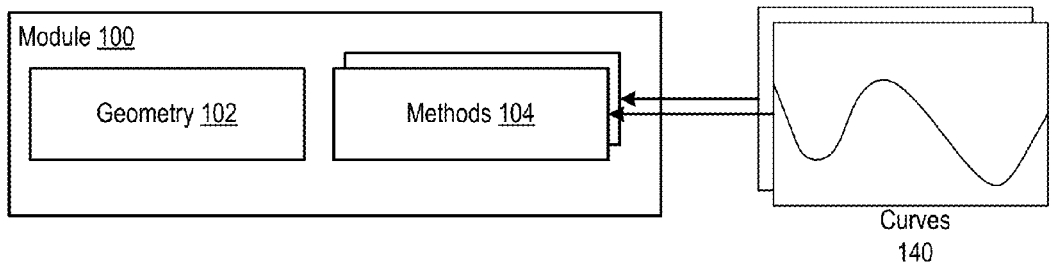
FIG. 1 illustrates a general framework for procedural modeling according to at least embodiments.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for specifying and interpolating hierarchical procedural models are described. Embodiments may provide a hierarchical framework for procedural modeling, and techniques for exploring procedural models based on that framework, that address the issues of complexity in procedural modeling. The procedural modeling hierarchical framework enables the user to construct procedural models from procedural model components. The procedural model components may be pre-existing (e.g., stored in and accessed from a procedural model library) or may be constructed by the user. The components may include procedural models that each include one or more modules that are sequentially executed according to their hierarchical arrangement in the models, modules that each include one or more procedural methods that are sequentially executed, and procedural methods. A module may include a geometry that is drawn according to the method(s) of the model. Note that a geometry may be a regular geometric shape such as a dot, line, triangle, square, rectangle, circle and so on, or may be any non-regular shape such as a leaf, branch, fruit (e.g., grape), stone, pattern, and so on.

Figure 9A:
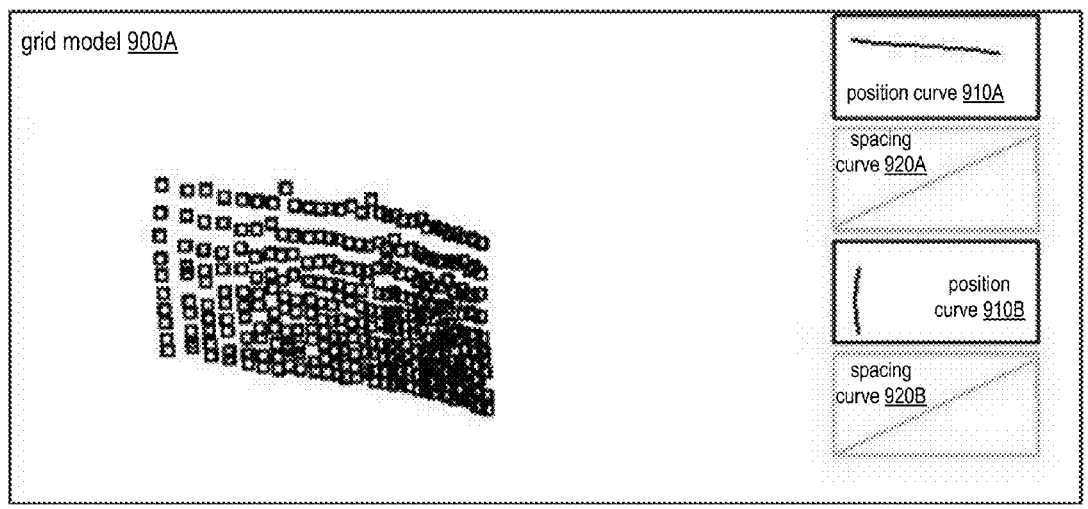
FIGS. 9A through 9C show example displays of procedural modeling according to some embodiments, and illustrate interpolation between two procedural models according to at least some embodiments.
Figure 9B:
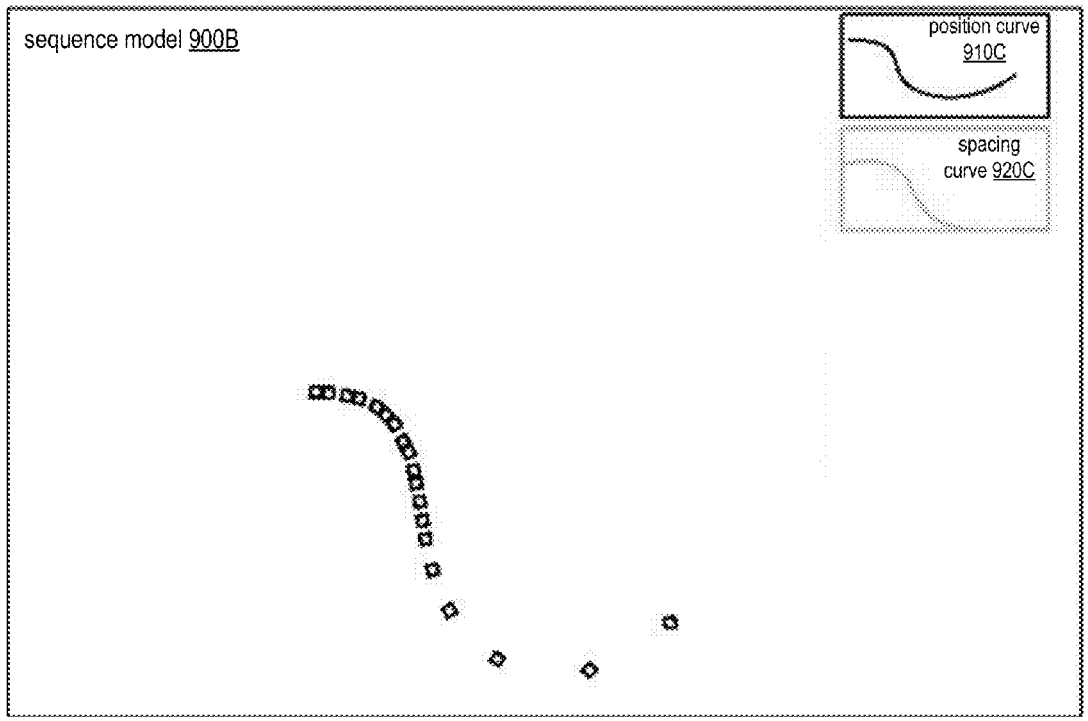
Figure 9C:
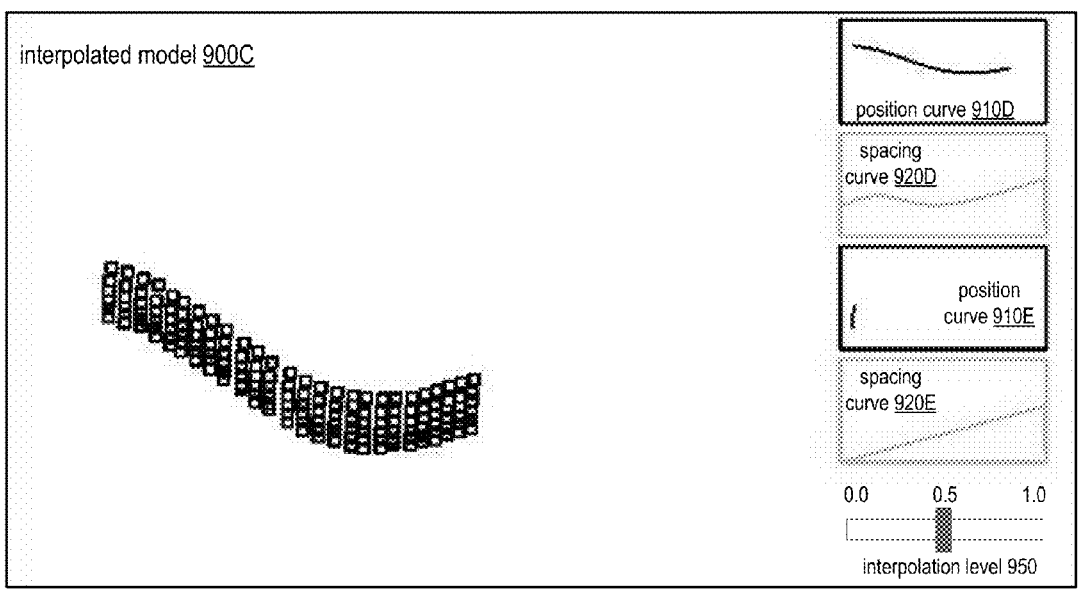

A procedural method may have one or more parameters associated with the method; the values of the parameter(s) control execution of the respective method. However, some methods may not have any parameters. In at least some embodiments, at least some methods may have a trigger parameter, which may be represented by a trigger curve, that specifies how often the method is to be executed. The trigger curve may be a straight line, an angled line, or a curve. The spacing curves 920 in FIGS. 9A through 9C are examples of trigger curves. In at least some embodiments, at least some methods may have a probability parameter that specifies a probability that the method is applied when triggered. Generally, the probability parameter value will be set to 1 (or some other value) so that the method is always applied when triggered. However, when interpolating between procedural models as described herein, the probability for a parameter may be set to less than 1. Another example of a parameter is a position parameter, such as the position curves 910 in FIGS. 9A through 9C; the position parameter describes a drawing path for the respective method over time. Another example of a parameter is a rotation angle that specifies how much rotation is to be applied to a geometry at each execution of the respective method. Another example of a parameter is a size parameter that may be used to increase or decrease the size of a geometry over time. These parameters are given by way of example, and not intended to be limiting; many other parameters for various procedural methods are possible and contemplated In the procedural modeling hierarchical framework, a module description may be condensed into a single array of values for parameters of the module. In at least some embodiments, the values for a given parameter may be graphically generated by drawing a curve representing the values over time. Thus, code writing may not be necessary to specify a procedural model; instead, a procedural model may be specified by constructing the procedural model from components and filling in values for arrays of parameters for the sequence of procedural methods in the procedural model, for example by drawing or modifying a curve that represents the values.

The procedural modeling hierarchical framework may enable interpolation between existing procedural models, or components thereof, to be performed. Embodiments may provide a procedural model interpolation technique in which procedural models may be combined or interpolated to form a third, combined or interpolated procedural model. Interpolation between models may be used, for example, in exploratory procedural modeling to more easily explore the procedural model space than can be done using conventional procedural modeling techniques.

Figure 16:
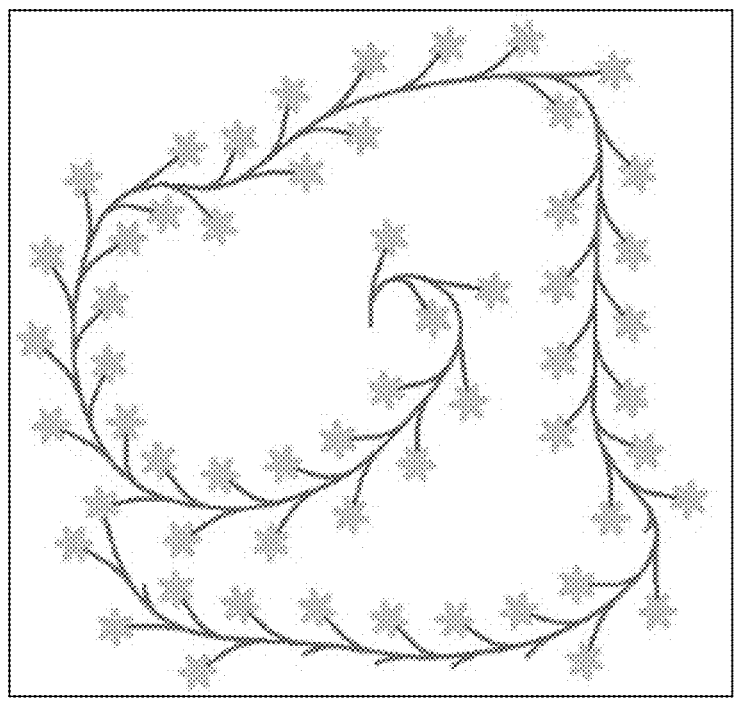
FIG. 16 illustrates an example complex graphical structure that may be generated according to at least some embodiments.

Embodiments may provide procedural modeling techniques based on the procedural modeling hierarchical framework that may be used to generate new procedural models, and that also may be used to combine and interpolate between existing procedural models. The procedural models so generated or interpolated may be used to synthesize complex graphical structures including one or more graphic modules based on sets of rules and parameters for the rules. A procedural modeling synthesizing technique may start from an initial feature and progressively replace and/or add graphic modules based on local generation rules specified by the procedural model. FIG. 16 illustrates an example relatively complex graphical structure (a vine with flowers) that may be generated using embodiments of the procedural models generated or interpolated according to the procedural modeling techniques described herein. The example graphical structure includes a stem, branches and flowers. Each of these components may be representative of a graphical module; these graphical modules are applied according to the procedural modeling synthesizing technique to generate the complex graphical structure shown in FIG. 16. In the hierarchical procedural model, each of these graphical modules may be represented by a module description according to the procedural modeling hierarchical framework as described herein.

Figure 12:
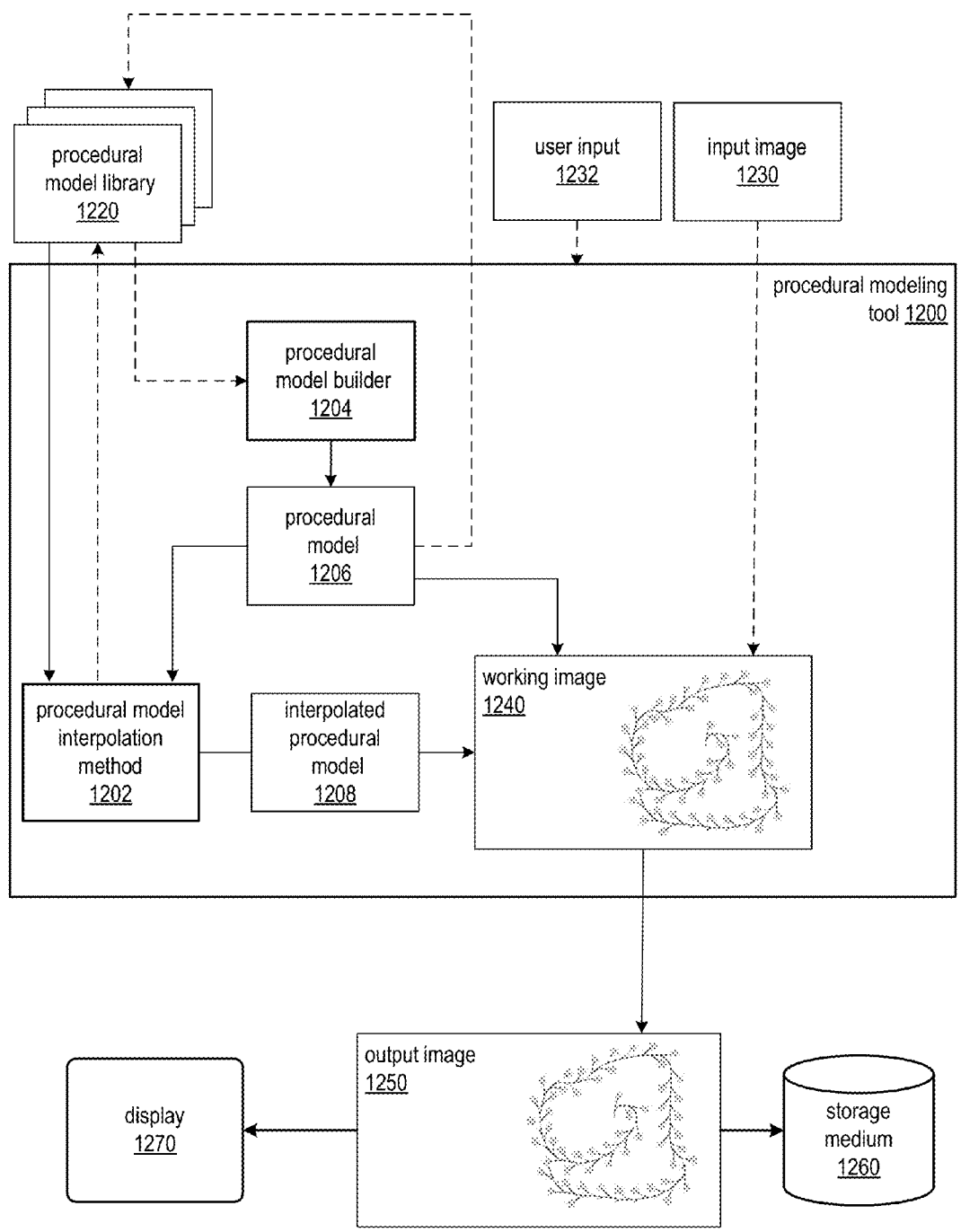
FIG. 12 illustrates an example procedural modeling tool according to at least some embodiments.
Figure 15:
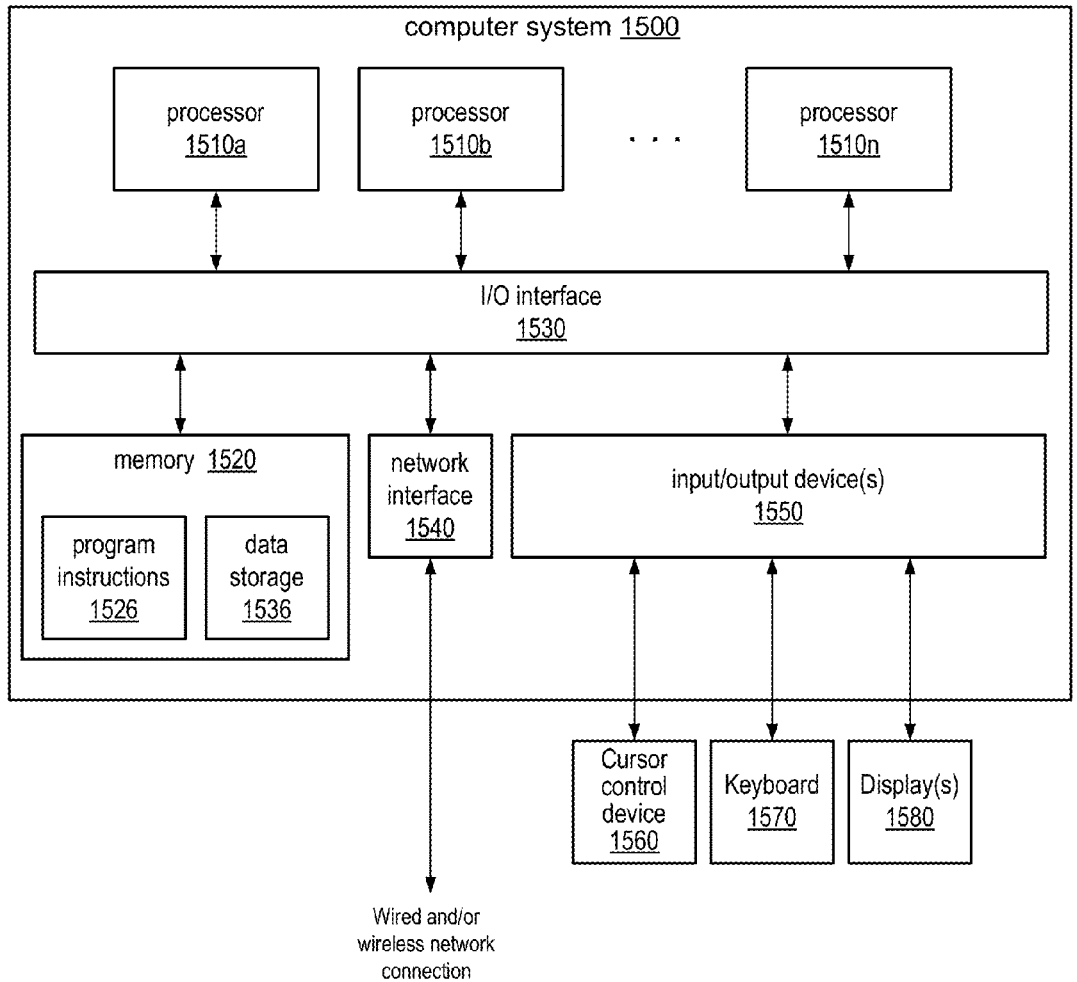
FIG. 15 illustrates an example computer system that may be used in embodiments.

Embodiments of the procedural modeling techniques based on the procedural modeling hierarchical framework, including a procedural model building method and a procedural model interpolation method as described herein, may be performed by a procedural modeling tool implemented by program instructions stored in a computer-readable storage medium and executable by one or more processors (e.g., one or more CPUs or GPUs). Embodiments of a procedural modeling tool may, for example, be implemented as a stand-alone application, as a module of an application, as a plug-in for applications including graphical design and image processing applications, and/or as a library function or functions that may be called by other applications such as graphical design and image processing applications. Embodiments of the procedural modeling tool may be implemented in any graphical design or image processing application, or more generally in any application in which general patterns may be synthesized. An example procedural modeling tool that may implement the procedural modeling techniques as described herein is illustrated in FIG. 12. An example system on which a procedural modeling tool may be implemented is illustrated in FIG. 15.

FIG. 1 illustrates a general procedural modeling hierarchical framework according to at least some embodiments, and shows a general, conceptual view of a module description. Embodiments may provide common procedural components (procedural models, modules, and procedural methods) and a general framework for building procedural models from the components. At least some embodiments may provide a procedural model library that includes a collection of procedural models and/or components thereof (modules and procedural methods) from which the user may select procedural models or components for building a procedural model. FIG. 1 shows a graphical representation of a generic module 100 according to at least some embodiments. Embodiments may provide a framework and techniques for procedural modeling in which a procedural model is expressed as a hierarchy of modules 100. Each module 100 may include a sequence of one or more operation blocks (procedural methods 104) and an optional geometry 102 for display. In at least some embodiments, the methods 104 may be sequentially executed according to the order the methods 104 appear in the module 100. A method 104 may be executed at intervals specified by a curve 140. A method 104 may use one or more curves 140 that control the method's parameters. A curve 140 may specify either a two-dimensional (2D) or one-dimensional (1D) value over time. Some methods 104 may be configured to generate instances of new modules 100, thus creating a hierarchy of modules 100.

Thus, embodiments may provide a general framework for procedural models in which each model is a collection of modules 100, every module 100 has a sequential list of methods 104 that modify the module's state, methods 104 may be linked to curves 140 for parameter input, and some modules 104 may have associated geometry 102 for display. At least some embodiments may provide a procedural model building technique and user interface via which a user may construct a procedural model by combining various pre-existing procedural model components, for example components selected from a procedural model library, and/or by creating new components for a procedural model. Thus, embodiments may allow a user to construct a procedural model according to the procedural modeling hierarchical framework by combining various pre-existing common components and/or user-generated components.

In addition, embodiments may provide an interpolation technique for combining two existing procedural models to generate a third, interpolated procedural model including a hierarchy of modules 104 that are a combination of the modules 104 from the two combined procedural models. This interpolation technique may, for example, be used to explore the design space of procedural models. At least some embodiments may provide a procedural model library that provides a collection of procedural models or components thereof from which the user may select procedural models to be interpolated.

A module description may be condensed into a single array of values for parameters of the module 104. Thus, code writing may not be necessary; instead, a module 104 may be specified by filling in values for arrays of parameters for the sequence of methods 104 in the module 104, and similarly a model may be specified by filling in the values for the parameters in the modules of the model. However, in some embodiments, some code writing may be performed, for example if the user needs to add a new procedural method or module, the user may be allowed to write code for the method or module.

Figure 2:
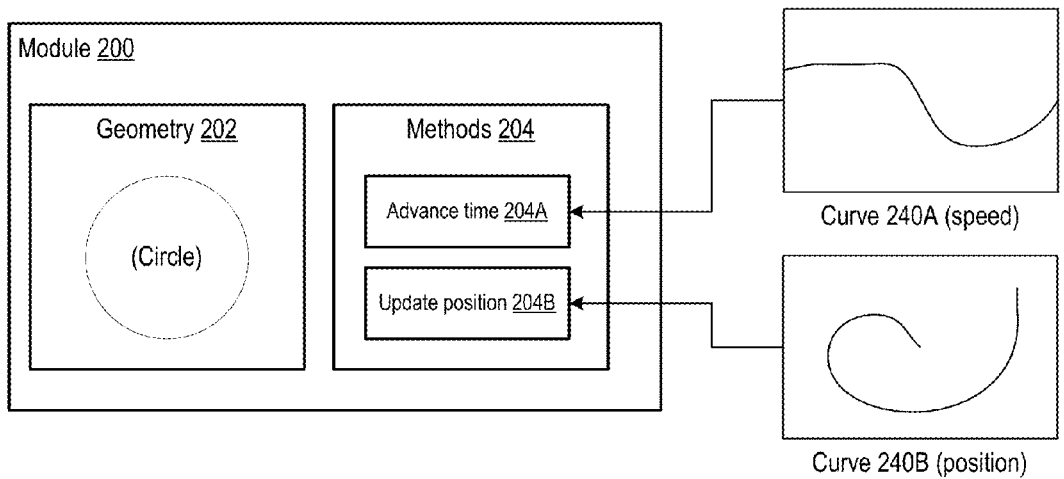
FIG. 2 graphically illustrates an example module, according to at least some embodiments.

FIG. 2 graphically illustrates an example module, according to some embodiments. Module 200 includes two methods 204: an advance time method 204A and an update position method 204B. A parameter (speed) may be input to advance time method 204A by curve 240A, and a parameter (position) may be input to update position method 204B by curve 240B. Module 200 also includes a geometry 202 (a circle, in this example), which is displayed by this module 200 according to the methods 204 and their respective parameters.

Figure 3:
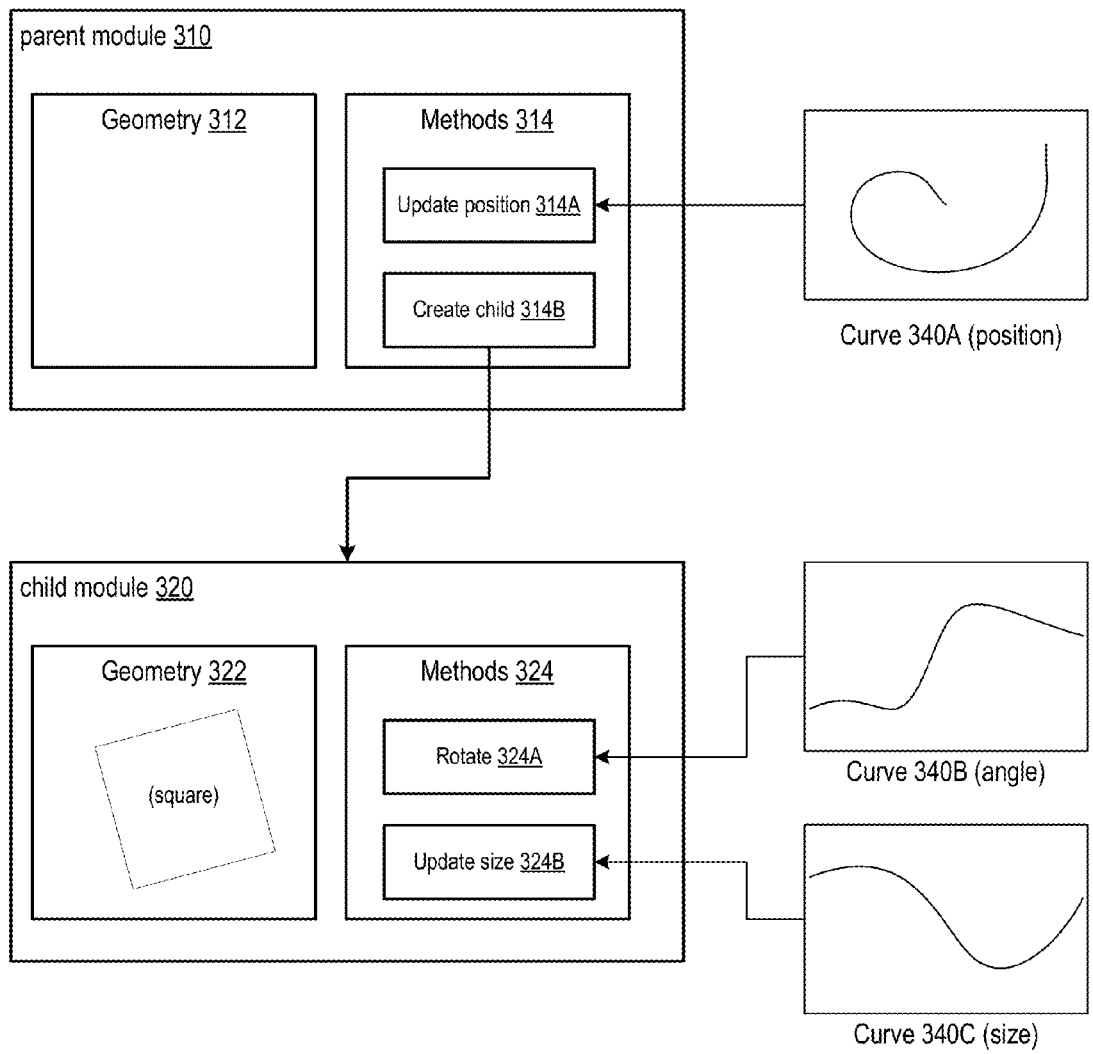
FIG. 3 graphically illustrates an example hierarchy of modules that collectively form a model description, according to at least some embodiments.

FIG. 3 graphically illustrates an example hierarchy of modules that collectively form a hierarchical model description, according to at least some embodiments. Parent module 310 includes two methods: update position method 314A and create child method 314B. Module 310 also includes a geometry 312 which is displayed by this module 310 according to the methods of 314 (314A and 314B) and their respective parameters. A parameter (position) may be input to update position method 314A by curve 340A. Create child method 314B may act to create a child module 320 for parent module 310. Child module 320 specifies a geometry 322 (in this example, a square) that may be displayed by this hierarchical model. Child module 320 includes two methods 324: rotate method 324A and update size method 324B. A parameter (angle) may be input to rotate method 324A by curve 340B, and a parameter (size) may be input to update size method 324B by curve 340C.

As noted above, a module description may be condensed into a single array of values. Thus, in at least some embodiments, a model may be specified by filling in an array of parameters for the sequence of procedural methods in the module. The following is an example of a code implementation of an animation model according to some embodiments. The example is not intended to be limiting. Comments are inserted in the text and are indicated by double slashes (//):

```
//////////////////////////////////////////////////////
// EXAMPLE ANIMATION MODEL
// Geometry (circle);
var geometry=new Geometry( );
geometry.addCircle(0.5);
//////////////////////////////////////////////////////
var MainModuleParams = new Array( )
MainModuleParams[idIndex] = "Main Module"
// Define curves that specify when the procedural methods s are executed, either always or
// at a predefined TIME curve - the user then can edit the TIME curve interactively
var alwaysCurveParams = new Array( )
alwaysCurveParams[0] = "ALWAYS"
var stepCurveParams = new Array( )
stepCurveParams[0] = "TIME"
stepCurveParams[1] = kFunctionCurve    // 1D curve
stepCurveParams[2] = [0, 0.0, 1, 0.05] // bbox
stepCurveParams[3] = [0.85, 0.85, 0]   // color
var initialStepCurve = new Geometry( )
initialStepCurve.addLineStrip([new Vector2(0,0), new Vector2(1,0.05)]) // in bbox coordinates
stepCurveParams[4] = initialStepCurve // default curve, user can change interactively later
// This curve is used by UpdatePosition method
var positionCurveParams = new Array( )
positionCurveParams[0] = "POSITION"
positionCurveParams[1] = kPositionCurve    // 2D curve
positionCurveParams[2] = [-5, -5, 5, 5]    // bbox
positionCurveParams[3] = [0, 0, 0]         // color
var initialPositionCurve = new Geometry( )
initialPositionCurve.addLineStrip([new Vector2(-4,-4), new Vector2(-1 ,1 ),
    new Vector2(3.4,4.1), new Vector2(4.8,4.6)]) //in bbox coordinates
```

-continued

```
positionCurveParams[4] = initialPositionCurve // default curve
// Here is the list of procedural methods; each method has a trigger curve (how often the
// method is called), the method itself (a JavaScript object), the parameters used when
// the method is created, the parameters used when the method is executed (applied),
// and an indicator that indicates if the method creates a new module (branch)
var methods1 = new Array( )
methods1[0] = [triggerCurve = alwaysCurveParams, method = AdvanceTime, newParams =
stepCurveParams, applyParams = 0, branch = 0]
methods1 [1] = [triggerCurve = alwaysCurveParams, method = UpdatePosition, newParams =
positionCurveParams, applyParams = [0 /* levelsAbove */, 0 TsetHeadingToTangent*/],
branch = 0]
MainModuleParams[methodsIndex] = methods1
MainModuleParams[geometryIndex] = geometry // geometry
```

Figure 13:
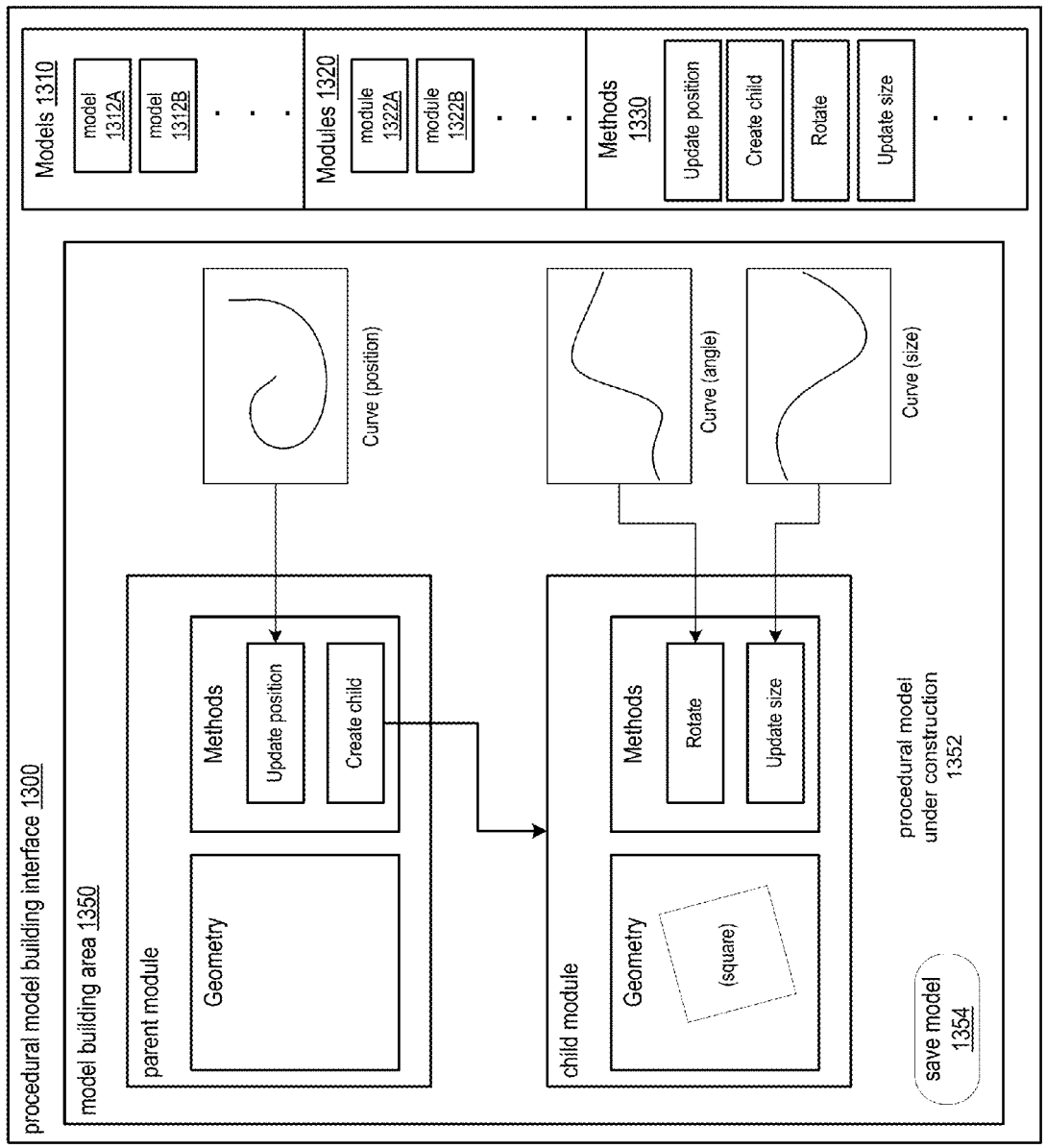
FIG. 13 illustrates an example graphical user interface to a procedural model builder component of a procedural modeling tool, according to some embodiments.

Some embodiments may allow a user to programmatically code a procedural model as illustrated above. In addition, at least some embodiments may provide a graphical method and user interface for constructing hierarchical procedural models from components, for example as illustrated in FIG. 13. In these embodiments, a graphically constructed procedural model may be converted to a code version of the procedural model as illustrated above for execution. Furthermore, an existing procedural model may be graphically modified, for example by graphically changing a parameter curve; this graphical modification may then be applied to the code version of the procedural model.

Interpolating Between Models

The procedural modeling hierarchical framework described herein enables interpolation between procedural models. At least some embodiments may provide a procedural model interpolation method. The procedural model interpolation method may be used, for example, in exploratory procedural modeling. Embodiments of the procedural model interpolation method may be performed by a procedural modeling tool implemented by program instructions stored in a computer-readable storage medium and executable by one or more processors (e.g., one or more CPUs or GPUs). An example procedural modeling tool that may implement the procedural model interpolation method is illustrated in FIG. 12. An example graphical user interface to the procedural model interpolation method implementation is illustrated in FIG. 13. An example system on which a procedural modeling tool may be implemented is illustrated in FIG. 15.

Figure 4:
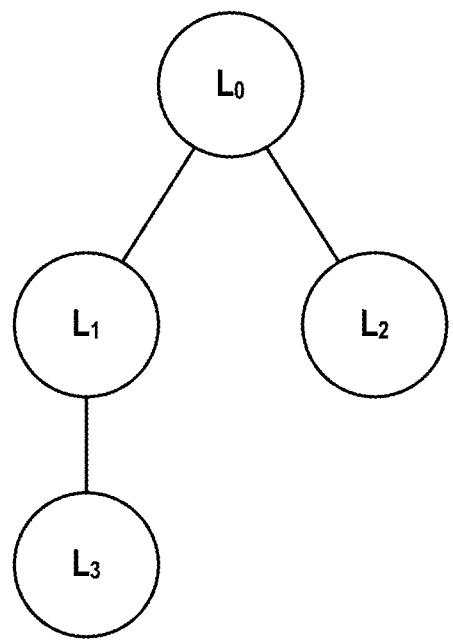
FIG. 4 graphically illustrates an example of a procedural model graph according to at least some embodiments.

FIGS. 4 through 8 graphically illustrate a procedural model interpolation method according to at least some embodiments. A hierarchical model description, such as the model description shown in FIG. 3, may be viewed as a graph in which nodes (corresponding to the modules in the procedural model) may be labeled by the array of procedural methods and their parameters. FIG. 4 illustrates an example of a procedural model graph or tree according to some embodiments. The example graph includes nodes $L_0, L_1, L_2,$ and $L_3$, with $L_0$ as the root node of the tree. Each node corresponds to a module in the procedural model. In graph formulation, according to some embodiments, each module is a node in the graph, each node's methods and geometry may form the node's label, and child nodes form edges. Procedural model graphs may be restricted to trees without losing much expressivity. Note that a node (module) may have no child nodes, one child node, or more than one child node. A node with no children is an edge node. In FIG. 4, nodes $L_2$ and $L_3$ are edge nodes.

At least some embodiments may provide an interpolation technique for interpolating between two procedural models in which two trees representing two procedural models are matched so that the ancestry is preserved; a node above another node stays above the other node, even if a new node is inserted between them. At least some embodiments may find correspondences between nodes so that the cost of matching is minimal. While embodiments of the interpolation technique are described in which models are matched so that the ancestry is preserved, the hierarchical procedural modeling framework may also enable interpolation between procedural models to be performed according to other mappings, for example mappings in which the ancestry is not necessarily preserved.

Figure 5:
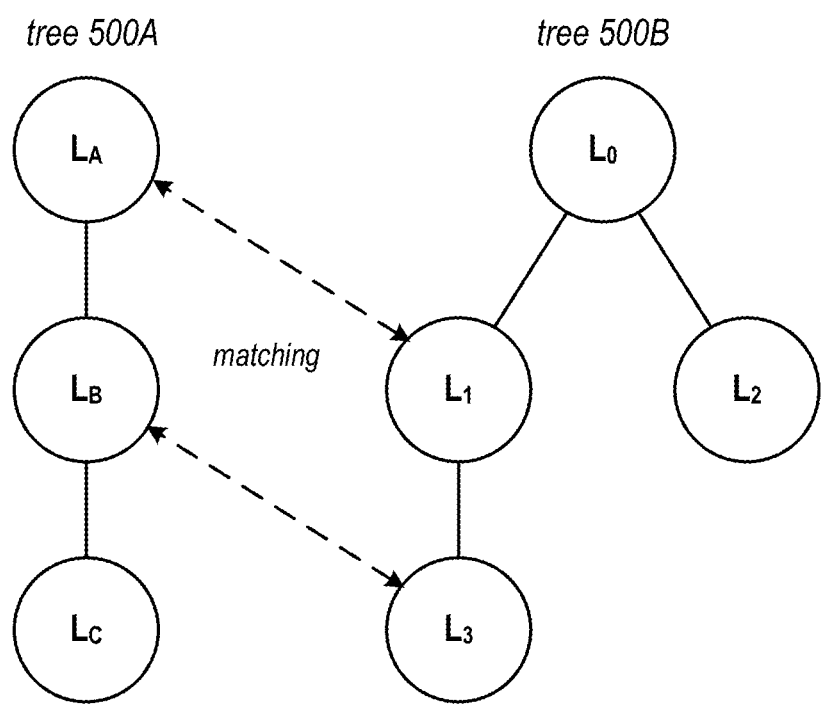
FIG. 5 graphically illustrates tree matching according to at least some embodiments.

FIG. 5 graphically illustrates tree matching according to some embodiments. Given two procedural model trees 500A and 500B, a matching between the trees is a function on the nodes that is one-to-one and ancestry preserving. In some embodiments, the cost of matching is the sum of the cost of relabeling each pair of mapped nodes and the cost of inserting/deleting each unmapped node. In FIG. 5, node $L_A$ of tree 500A has been matched to node $L_1$ of tree 500B, and node $L_B$ of tree 500A has been matched to node $L_3$ of tree 500B.

Figure 6:
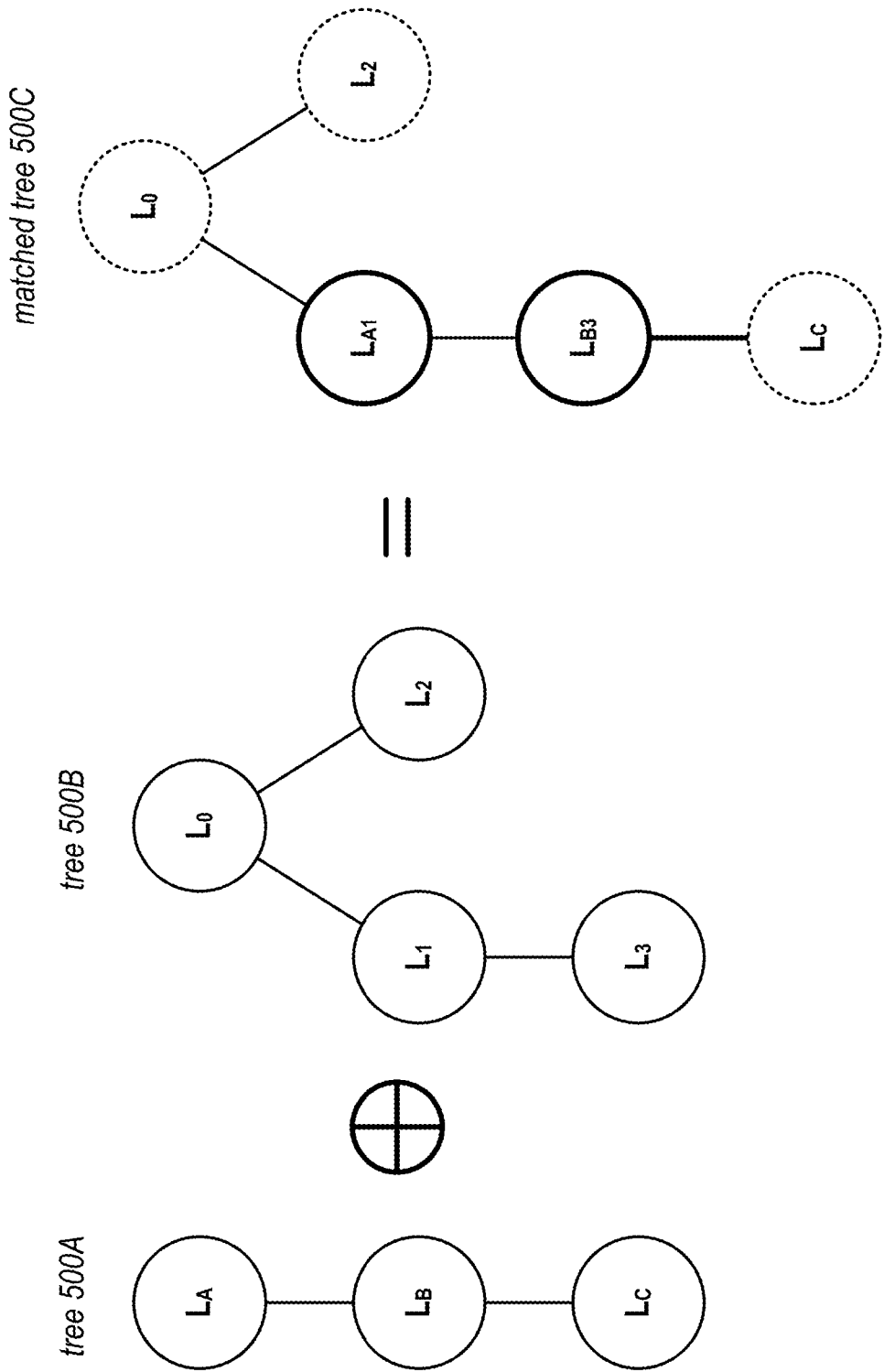
FIG. 6 graphically illustrates optimal tree matching according to at least some embodiments.

FIG. 6 graphically illustrates optimal tree matching according to some embodiments. In optimal tree matching, finding the least-cost matching is NP-complete. Some embodiments may use fast heuristic algorithms to perform optimal tree matching. In FIG. 5, node $L_A$ of tree 500A has been matched to node $L_1$ of tree 500B, and node $L_B$ of tree 500A has been matched to node $L_3$ of tree 500B. Tree 500C represents a matched node that is the result of matching trees 500A and 500B. Note the two matched nodes $L_{A1}$ and $L_{B3}$ in matched tree 500C.

Figure 7:
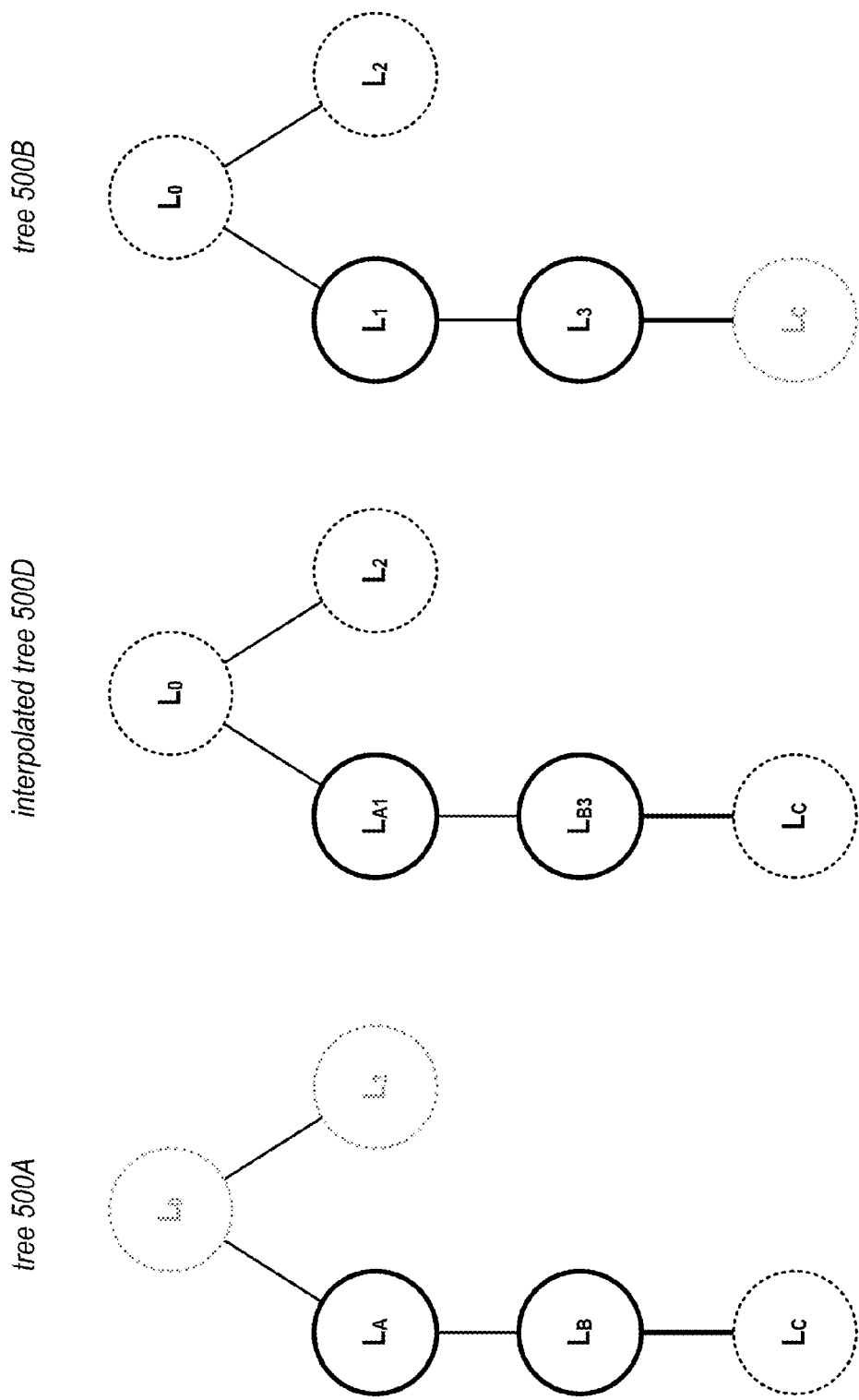
FIG. 7 graphically illustrates interpolation of procedural models via tree matching, according to at least some embodiments.

FIG. 7 graphically illustrates interpolation of procedural models via tree matching, according to some embodiments. Once the matching nodes in trees (e.g., tree 500A and tree 500B in FIG. 7) are found as shown in FIGS. 5 and 6, embodiments may create an interpolated tree 500D, as shown in FIG. 7. Note the two interpolated nodes $L_{A1}$ and $L_{B3}$ in interpolated tree 500D.

Figure 8:
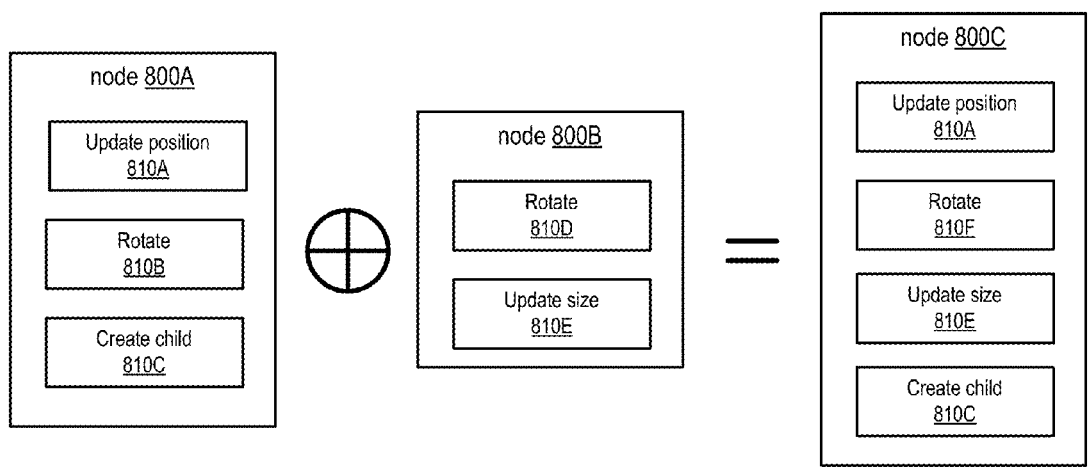
FIG. 8 graphically illustrates aligning the procedural methods in modules in producing an interpolated node according to at least some embodiments.

To interpolate matched nodes, the methods in each node are aligned, and then the common parameters for the methods are interpolated. FIG. 8 graphically illustrates aligning methods in nodes in producing an interpolated node according to some embodiments. In FIG. 8, the methods 810A, 810B, and 810C in a first node 800A are aligned with the methods 810D and 810 E in a second node 800B to generate methods 810A, 810C, 810E and 810F in an interpolated node 800C. Note that rotate method 810F in node 800C is interpolated from rotate method 810B in node 800A and rotate method 810D in node 800B.

As previously noted, the methods 810A, 810B, 810C, 810D, 810E, and 810F, hereafter collectively referred to as 810, and parameters of a node 800 may be viewed as a label for the node 800. To interpolate labels, the methods 810 are aligned, common parameter curves are interpolated, and each method 810 810A, 810B, 810C, 810D, 810E, and 810F must specify a null state. In at least some embodiments, if there is no matching method in one node for a method 810 810A, 810B, 810C, 810D, 810E, or 810F in another node, a no-op method may be created with parameters that indicate a no-operation, null or default for that given node (i.e., a null or default state for the method in the node). For example, for a rotate method 810B, the null state may be rotation by 0 degrees. Interpolation may then be performed between the no-op method and the defined method 810B in the other node. For example, in FIG. 8, a no-op update size method may be generated for node 800A, and a no-op update position method may be generated for node 800B; the no-op methods may then be interpolated with update size method 810E and update position method 810A, respectively.

Matching and Cost

In some embodiments, matching of modules may be performed based on minimizing a cost function. When matching tree nodes (modules), a cost of matching two nodes may be expressed from the two matched trees (e.g., see tree 500A and tree 500B in FIGS. 5 and 6) and the cost of having nodes that do not have a match in the other tree (e.g. $L_0$, $L_2$, and $L_c$ in the matched tree 500C of FIG. 6).

In some embodiments, a cost of matching two nodes may be expressed by evaluating a cost of matching two methods. Methods of the same or similar type may generally be matched, but even then there may be some cost due to differences in parameters and curves used by the method. If a method in a node does not have a matching method in another node to which the node is being matched, a null or no-op method may be created for the given method, and the cost may be evaluated according to the difference between the no-op method and the existing method. For example, for an update rotation method, the no-op method would rotate by 0 degrees at any time t.

There are various techniques for matching methods in modules while maintaining the order of the methods that may be used in various embodiments. In some embodiments, the following matching technique may be used. Given two lists of methods specified by $\{m1_i\}$ and $\{m2_k\}$, a matched list $\{m3_k\}$ is to be created. Assume (i−1) methods m1 and (j−1) methods m2 have been processed, and there are n methods m3 (starting with i=0, j=0, and n=0). A comparison of $m1_i$ and $m1_j$ is performed. If $m1_i$ and $m1_j$ are the same, then further analysis is not required. If not, a smallest s is found, where s>=j so that $m1_i=m2_s$ and $m1_j$. If such an s exists, the methods are moved from m2 that was skipped to the matched list m3 as their null versions, and $m1_i$ is added just after them. If s is not found, $m1_i$ is added to the matched list m3. The sides are alternated so that the next step is looking for m1 that matches $m2_k$.

The matching of trees may thus be based on the cost of matching nodes, and at least some embodiments may attempt to find a configuration that incurs a minimal cost for a match.

In some embodiments, instead of or in addition to parameter space interpolation, both parameters and model descriptions may be interpolated. Thus, an exploratory procedural modeling technique may be provided that employs model interpolation to explore model space as well as or instead of parameter interpolation to explore parameter space.

FIGS. 9A through 9C show example user interface displays that may be implemented in a procedural modeling tool according to some embodiments, and illustrate interpolation between two procedural models according to some embodiments. FIG. 9A shows an example grid model 900A, FIG. 9B shows an example sequence model 900B, and FIG. 9C shows an interpolation 900C between the models of FIGS. 9A and 9B. The black boxes on the right represent the curves controlling the position of the modules of the procedural models, and the gray boxes represent the curves controlling the spacing of the modules. In the grid model 900A shown in FIG. 9A, position curves 910A and 910B and spacing curves 920A and 920B are used. In the sequence model 900B shown in FIG. 9B, only two curves (position curve 910C and spacing curve 920C) are used. In the grid model shown in FIG. 9A, the upper two curves 910A and 920A control the rows, and the lower two curves 910B and 920B control the columns. The matching technique identifies the sequence with the rows of the grid, so that when interpolating between the two models 900A and 900B, the columns of the grid tend to shrink away, as shown in the interpolated model 900C of FIG. 9C, which illustrates an interpolation level of 0.5 or 50%, which may be controlled via an interpolation level slider bar 950 or via some other user interface element. Note that position curve 910D is an interpolation between curves 910A and 910C, and spacing curve 920D is an interpolation between curves 920A and 920C. Position curve 910E and spacing curve 920E may be viewed as interpolations between curves 910B and 920B of model 900A and null or no-op curves for model 900B, which does not have those parameters.

Figure 10:
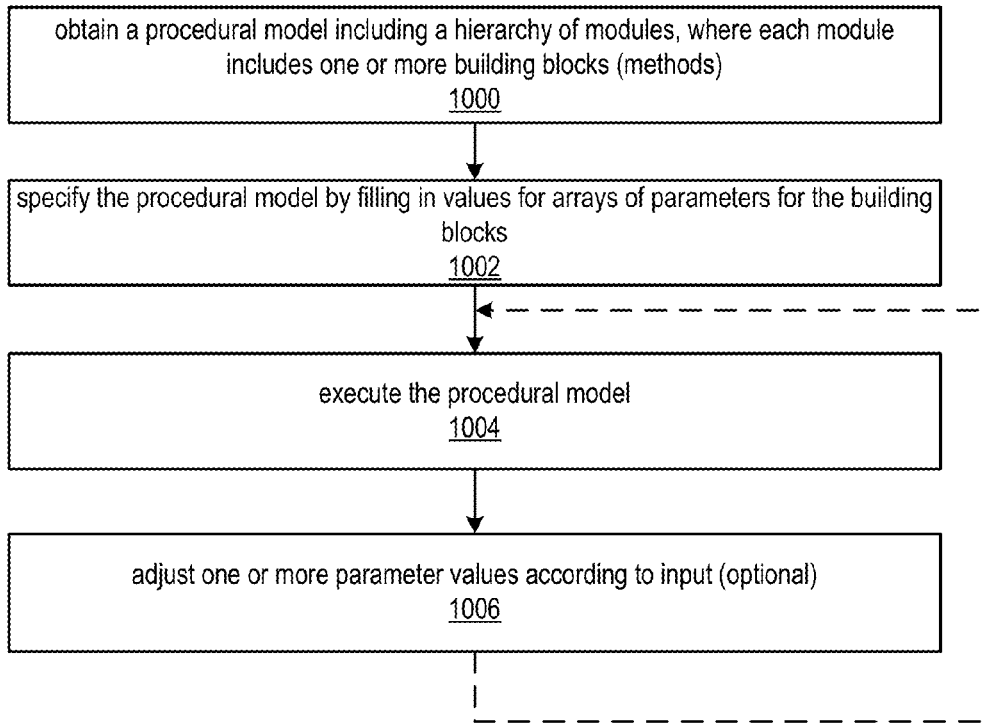
FIG. 10 is a flowchart of a method for procedural modeling according to at least some embodiments.

FIG. 10 is a flowchart of a method for procedural modeling according to some embodiments. This method may be used to construct procedural models and/or to modify existing procedural models. As indicated at 1000, a procedural model according to the hierarchical procedural modeling framework may be obtained. At least some embodiments may provide a procedural model building technique and user interface via which a user may construct a procedural model by combining various pre-existing components, for example components such as methods, modules, or entire procedural models, selected from a procedural model library, and/or by creating new components (methods or modules) for a procedural model. Thus, embodiments may allow a user to construct a procedural model according to the procedural modeling hierarchical framework by combining various pre-existing components and/or user-generated components. The procedural model may include a hierarchy of modules, where each module includes one or more procedural methods. See, for example, FIGS. 2 and 3. One or more of the modules may specify a geometry to be displayed according to the methods. As indicated at 1002, the procedural model may be specified by filling in or modifying values for arrays of parameters for the methods. In at least some embodiments, the values for at least some parameters may be specified via a graphical user interface representation of a parameter curve; the user may draw or modify a curve on a user interface to indicate the values for a respective parameter. Alternatively, a curve may be specified using some other method. For example, the curve's parameters may be provided in a specification file for the procedural model, or the curve may be created in a different software application, stored in a file, and imported from the file. FIGS. 9A and 9B illustrate example user interfaces that each include a representation of a procedural model and curves that are used to specify values for parameters of the respective procedural model. Thus, using embodiments, it may not be necessary to perform complex coding to specify or modify a procedural model. As indicated at 1004, the procedural model may be executed to display a static display or an animation according to execution of the procedural methods as guided by the respective parameter values. FIG. 16 shows an example static display that may be generated by a procedural model constructed according to embodiments. As indicated at 1006, optionally, one or more parameter values may be adjusted according to input to a user interface. For example, a curve may be manipulated via a user interface to manipulate the value for a parameter. See, for example, the curves 910 and 920 illustrated in FIGS. 9A through 9C. The procedural model may then be executed to display the static display or animation according to execution of the procedural methods as guided by the modified parameter values.

Figure 11:
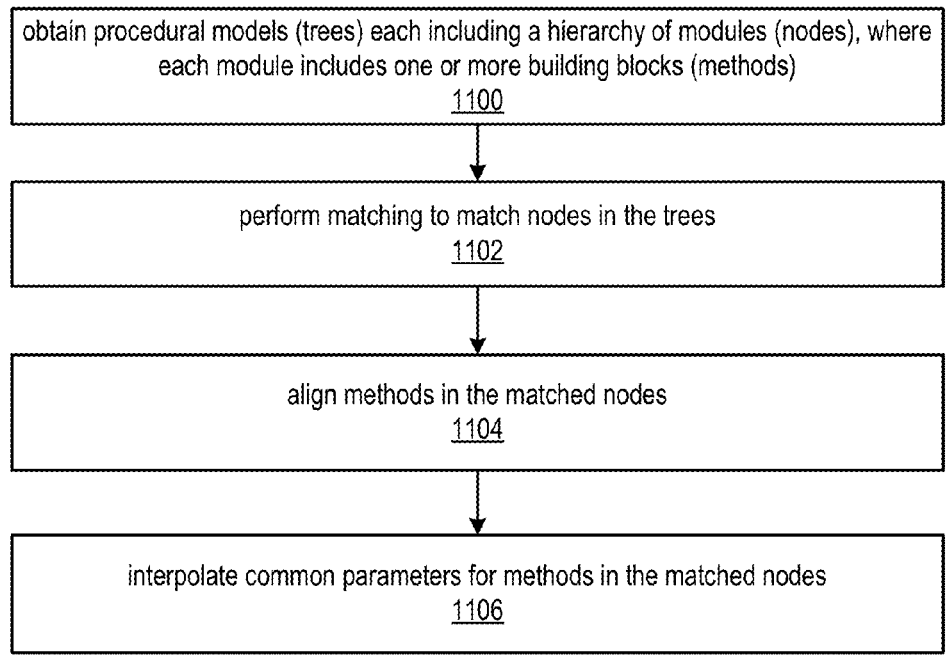
FIG. 11 is a flowchart of a method for interpolating between procedural models according to at least some embodiments.

FIG. 11 is a flowchart of a method for interpolating between procedural models according to at least some embodiments. As indicated at 1100, procedural models to be interpolated may be obtained. For example, the procedural models to be interpolated may be selected from a procedural model library. The procedural models may be represented as trees that may each include a hierarchy of nodes (modules), where each module includes one or more procedural methods. See, for example, FIGS. 3, 4, and 5. One or more of the modules may specify a geometry to be displayed according to the methods of the respective module. While not shown, the procedural models may be specified to indicate values for the parameters, for example as illustrated in FIG. 10. As indicated at 1102 of FIG. 11, the trees may be matched to find matching nodes in the trees. In some embodiments, the trees may be matched according to a cost function. See FIGS. 5 and 6 for a graphical representation of tree matching. FIG. 7 shows an example interpolated tree produced by interpolating between two trees. As indicated at 1104 of FIG. 11, methods in the matched nodes may be aligned. See FIG. 8 for an example of aligning methods in nodes when producing an interpolated node. As indicated at 1106 of FIG. 11, values of common parameters for procedural methods of the matched nodes may be interpolated between the matched nodes. See FIGS. 9A through 9C for an example of interpolating values for parameters.

At least some embodiments may provide one or more user interface elements, for example one or more slider bars, via which a user may control level(s) of interpolation, for example between 0.0 and 1.0 (0% and 100%). FIG. 9C illustrates an example user interface including a slider bar 950 for controlling interpolation levels. Some embodiments may allow interpolation levels to be pushed below 0 (0%) and/or above 1 (100%) so that parameter values in two trees being combined may be extrapolated.

Example Implementations

Embodiments of the procedural modeling hierarchical framework, methods and techniques described herein may, for example, be used in controlling the synthesis of patterns (pattern synthesis) using procedural models in computer graphics. Embodiments may be used in generating animations as well as static models. Embodiments of the procedural modeling hierarchical framework and the procedural modeling methods and techniques described herein may be implemented in graphics applications, for example as a procedural modeling tool provided in a stand-alone graphics application or as a procedural modeling tool of a graphics application or graphics library. Examples of graphics applications in which embodiments may be implemented may include, but are not limited to, painting, publishing, photography, games, animation, and/or other applications. Embodiments of a procedural modeling tool may implement at least the procedural modeling hierarchical framework and the methods for procedural model matching and interpolation as described herein. FIG. 12 illustrates an example embodiment of a procedural modeling tool. FIG. 15 illustrates an example of a computer system in which embodiments of a procedural modeling tool or components thereof may be implemented.

FIG. 12 illustrates an example procedural modeling tool according to some embodiments. Procedural modeling tool 1200 may access a procedural model library 1220 that provides a collection of procedural models or components thereof from which the user may, for example, select procedural models to be interpolated or otherwise manipulated. A procedural model builder 1204 component may be used to specify new procedural models 1206 and the components thereof or to modify existing procedural models (e.g., procedural models from library 1220) according to a procedural modeling hierarchical framework as described herein. Each procedural model may be a collection of modules. Every module has a list of methods that modify the module's state. The methods may be linked to curves for parameter input; and some modules may have associated geometry for display. A module may have one or more child modules. Procedural modeling tool 1200 may provide one or more user interface elements to the procedural model builder 1204 via which the user may specify and/or modify components of a procedural model 1206, for example one or more user interface elements via which a user may draw a parameter curve, or one or more user interface elements via which a user may select procedural model components, for example a module, method, or tree, from library 1220 to be added to a procedural model 1206.

An implementation of a procedural model interpolation method 1202 may be used to interpolate between procedural models as described herein to generate and interpolated procedural model 1208, allowing the user to explore parameter space and, in at least some embodiments, procedural model space. Procedural modeling tool 1200 may provide one or more user interface elements to the procedural model interpolation method 1202 via which the user may select procedural models to be interpolated form the library 1220. Alternatively, the user may generate a procedural model 1206 using procedural model builder 1204 and select another procedural model, for example from library 1220, for interpolation. Procedural modeling tool 1200 may also provide one or more user interface elements via which the user may specify an interpolation level, for example one or more slider bars.

In at least some embodiments, procedural modeling tool 1200 may allow the user to add generated procedural models 1206 and/or interpolated procedural models 1208 to procedural model library 1220.

In at least some embodiments, procedural modeling tool 1200 may receive an input image 1230 to be used as a working image 1240. Alternatively, the module 1200 may be used to generate a new image as working image 1240. Generated procedural models 1206 and/or interpolated procedural models 1208 may be displayed to the working image 1240.

Procedural modeling tool 1200 may provide a user interface that includes various user interface elements via which a user may interact, via user input 1232, with components of the tool 1200 including, but not limited to, procedural model interpolation method 1202 and procedural model builder 1204, for example user interface elements to select, enter or modify procedural models or procedural model components when specifying or modifying a procedural model with procedural model builder 1204 or when interpolating models with procedural model interpolation method 1202. The user interface may also provide user interface elements, for example curves as shown in FIGS. 9A through 9C, slider bars, and so on, via which values for parameters may be entered or adjusted. At least some embodiments of the user interface may provide one or more user interface elements, for example a slider bar, via which a user may control level(s) of interpolation, for example between 0.0 and 1.0 (0% and 100%). Some embodiments may allow interpolation levels to be pushed below 0 and/or above 1 so that values in interpolated trees may be extrapolated.

Procedural modeling tool 1200 may generate an output image 1250. Output image 1250 may, for example, be stored to a local or network storage medium 1260, such as system memory, a local or network disk drive or other storage system, DVD, CD, etc., and/or may be displayed to a display device 1270. Note that output image 1250 may be an animation or a static model.

Note that, while procedural modeling tool 1200 shows both a procedural model builder 1204 component and a procedural model interpolation method 1202 component, some embodiments of procedural modeling tool 1200 may implement only one of the two components.

FIG. 13 illustrates an example graphical user interface to a procedural model builder 1204 component of a procedural modeling tool 1200, according to some embodiments. This interface is given by way of example, and is not intended to be limiting. The procedural model building interface 1300 may enable the user to graphically build or modify procedural models according to the hierarchical framework for procedural modeling. The procedural model building interface 1300 may include a model building area 1350 in which a user may build a procedural model 1352 from procedural model components. The procedural model building interface 1300 may also include one or more user interface elements from which the user may select procedural model components to be added to the procedural model 1352 under construction. The procedural model components may be stored in a procedural model library. This example procedural model building interface 1300 includes a models 1310 palette from which the user may select a procedural model 1312, for example to be used as a base model 1352 to which modules and/or methods may be added or removed or to be added to a model 1352 under construction. This example also includes a modules 1320 palette from which the user may select one or more modules, such as 1322A and 1322B, to construct a model 1352 or to be added to a model 1352 under construction and a methods 1330 palette from which the user may select one or more methods to be added to a module of a model 1352 under construction. While not shown, at least some embodiments may include one or more user interface elements via which the user may select or specify a geometry for a module.

In at least some embodiments, to add a component to a procedural model 1352, the user may drag-and-drop the component from a palette onto model building area 1350. In at least some embodiments, the user may start constructing a model 1352 either by dragging and dropping a model 1312 onto model building area 1350 or by dragging and dropping a module 1322 onto model building area 1350. Additional modules 1322 may then be added to the model 1352 under construction, and/or methods 1330 may be added to, removed from, or rearranged in the modules of the model 1352.

In at least some embodiments, an entire model 1312 may be plugged into another model 1352. For example, one procedural model 1312A may create a tree or a vine with branches and flowers. Another procedural model 1312B may just create a flower. Embodiments may allow the user to drag-and-drop the model 1312A into model building area 1310, and allow the user to plug in procedural model 1312B into an appropriate place in procedural model 1312A, e.g. at the end of a "branch" module (or underneath the branch module in the hierarchical model 1352). In at least some embodiments, the user interface may allow the user to interpolate between the two models 1312A and 1312B as described herein, for example using a slider bar to specify an interpolation level, to determine the effects that the combination of the models 1312 will have at different levels of interpolation.

In at least some embodiments, the user interface may display a graphical representation of the components(s) of the procedural model 1352 under construction. As shown in FIG. 13, a graphical representation of the modules and their associated geometry and methods may be displayed, as well as indications of the hierarchical relationships among the components in the procedural model 1352. For example the methods in a module may be executed sequentially, so the methods in a module may be displayed in sequential order from first to last. As another example, the hierarchical relationship among the modules may be indicated.

In at least some embodiments, the user interface may display, or may provide a method via which the user can choose to display, one or more curve user interface elements for the parameter(s) of a method of procedural model 1352. The user interface may enable the user to draw or modify the curve(s) for the respective parameter(s) in the curve user interface elements. Note that a given method may have no parameters, one parameter, or more than one parameter. For example, an update position method may include a position parameter and a spacing parameter, a rotate method may include a rotation angle parameter, and a create child method may not include any parameters.

In at least some embodiments, a procedural model 1352 may be, but is not necessarily, stored as a new model 1312, for example by adding the procedural model 1352 to a procedural model library. For example, some embodiments may provide a save model 1354 user interface element (e.g., a button or menu selection) via which the user may choose to save a procedural model 1552.

In some embodiments, instead of or in addition to the graphical user interface for building procedural models according to the hierarchical framework for procedural modeling as shown in FIG. 13, the user may programmatically construct a procedural model according to the hierarchical framework for procedural modeling. See the EXAMPLE ANIMATION MODEL for an example of a programmatically constructed procedural model. In some embodiments, a programmatically constructed procedural model may be added to a procedural model library, and may be displayed, along with its components, by the procedural model building interface 1300 so that the procedural model and/or its components may be used in the graphical procedural model building technique.

Figure 14:
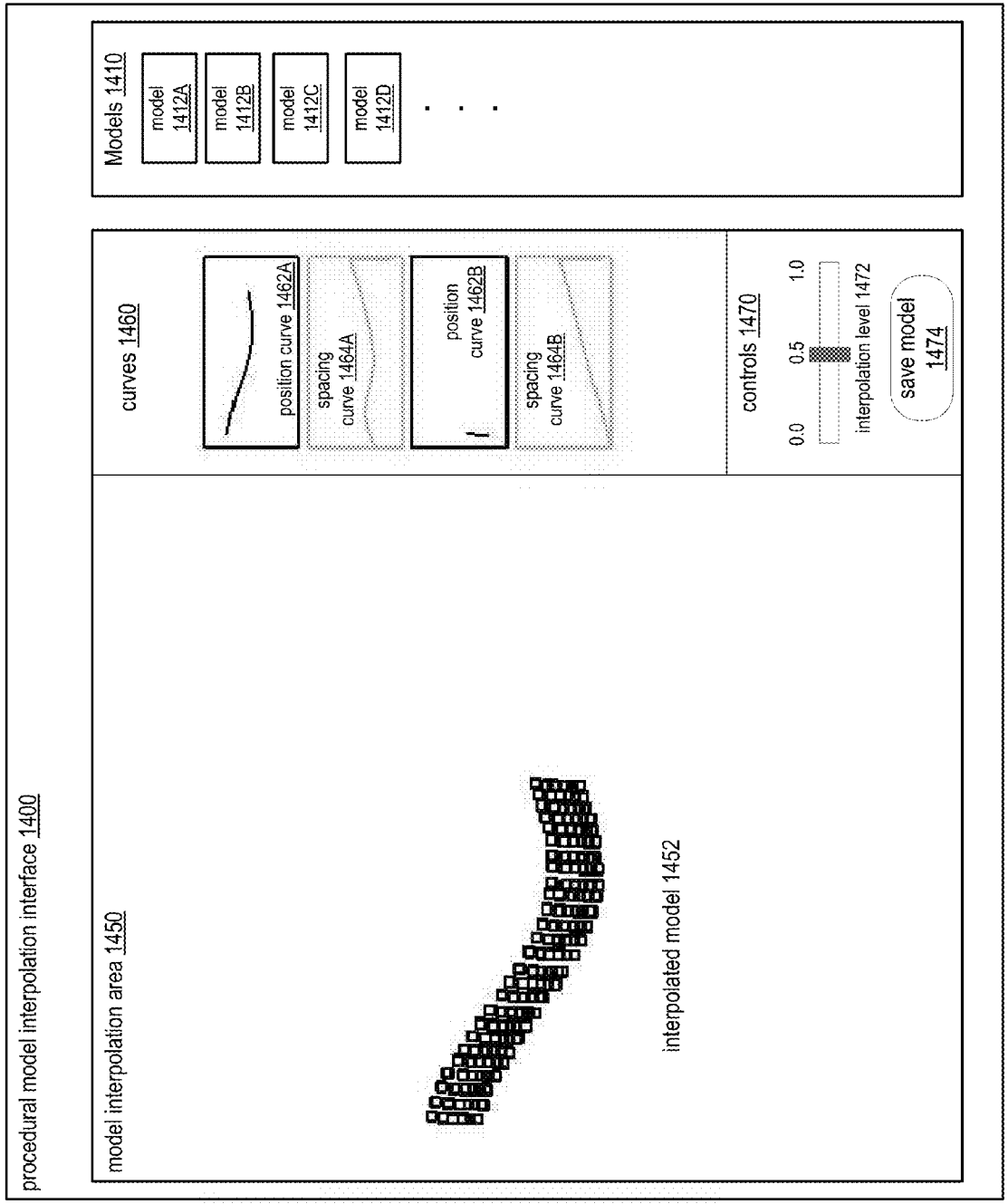
FIG. 14 illustrates an example graphical user interface to a procedural model interpolation method component of a procedural modeling tool, according to some embodiments.

FIG. 14 illustrates an example graphical user interface to a procedural model interpolation method 1202 component of a procedural modeling tool 1200, according to some embodiments. This interface is given by way of example, and is not intended to be limiting. The procedural model interpolation interface 1400 may enable the user to interpolate procedural models according to the hierarchical framework for procedural modeling, allowing the user to graphically explore the procedural modeling space. The procedural model interpolation interface 1400 may provide one or more user interface elements, for example a models palette 1410, from which the user may select procedural models 1412A, 1412B, 1412C, and 1412D to be interpolated. The procedural models 1412A, 1412B, 1412C, and 1412D may be stored in a procedural model library. The procedural model interpolation interface 1400 may include a model interpolation area 1450 in which the graphical results of interpolation between two selected models of 1412A, 1412B, 1412C, and 1412D may be displayed as interpolated model 1452. The procedural model interpolation interface 1400 may include a curves 1460 area in which interpolated parameter curves 1462A, 1462B, 1464A, and 1464B may be displayed. The procedural model interpolation interface 1400 may include a controls 1470 area in which one or more controls, for example a slider bar or other user interface element for setting the interpolation level 1472 to be used. Changing the interpolation level 1472 causes corresponding changes to the displayed interpolated model 1452. Note that, in some embodiments, the controls 1470 may allow the user to set an interpolation level below 0 (0%) and/or above 1 (100%) so that parameter values in two procedural models being combined may be extrapolated.

In at least some embodiments, an interpolated model 1452 may be, but is not necessarily, stored as a new model similar to 1412A, 1412B, 1412C, or 1412D, for example by adding the interpolated model 1452 to a procedural model library. For example, some embodiments may provide a save model 1474 user interface element (e.g., a button or menu selection) via which the user may choose to save an interpolated model 1452.

While not shown in FIG. 14, some embodiments may allow modules, methods, and/or parameters to be selected and interpolated similarly to how models are interpolated.

Example System

Embodiments of a procedural modeling tool as described herein may be executed on one or more computer systems, which may interact with various other devices. One such computer system is illustrated by FIG. 15. In different embodiments, computer system 1500 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1500 includes one or more processors 1510A, 1510B . . . 1510N, hereafter referred to collectively, or individually, as 1510, coupled to a system memory 1520 via an input/output (I/O) interface 1530. Computer system 1500 further includes a network interface 1540 coupled to I/O interface 1530, and one or more input/output devices 1550, such as cursor control device 1560, keyboard 1570, and display(s) 1580. In some embodiments, it is contemplated that embodiments may be implemented using a single instance of computer system 1500, while in other embodiments multiple such systems, or multiple nodes making up computer system 1500, may be configured to host different portions or instances of embodiments. For example, in one embodiment some elements may be implemented via one or more nodes of computer system 1500 that are distinct from those nodes implementing other elements.

In various embodiments, computer system 1500 may be a uniprocessor system including one processor 1510, or a multiprocessor system including several processors 1510 (e.g., two, four, eight, or another suitable number). Processors 1510 may be any suitable processor capable of executing instructions. For example, in various embodiments, processors 1510 may be general-purpose or embedded processors implementing any of a variety of instruction set architectures (ISAs), such as the x86, PowerPC, SPARC, or MIPS ISAs, or any other suitable ISA. In multiprocessor systems, each of processors 1510 may commonly, but not necessarily, implement the same ISA.

In some embodiments, at least one processor 1510 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the procedural modeling methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1520 may be configured to store program instructions and/or data accessible by processor 1510. In various embodiments, system memory 1520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a procedural modeling tool are shown stored within system memory 1520 as program instructions 1526 and data storage 1536, respectively. In other embodiments, program instructions and/or data may be received, sent or stored upon different types of computer-accessible media or on similar media separate from system memory 1520 or computer system 1500. Generally speaking, a computer-accessible medium may include storage media or memory media such as magnetic or optical media, e.g., disk or CD/DVD-ROM coupled to computer system 1500 via I/O interface 1530. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1540.

In one embodiment, I/O interface 1530 may be configured to coordinate I/O traffic between processor 1510, system memory 1520, and any peripheral devices in the device, including network interface 1540 or other peripheral interfaces, such as input/output devices 1550. In some embodiments, I/O interface 1530 may perform any necessary protocol, timing or other data transformations to convert data signals from one component (e.g., system memory 1520) into a format suitable for use by another component (e.g., processor 1510). In some embodiments, I/O interface 1530 may include support for devices attached through various types of peripheral buses, such as a variant of the Peripheral Component Interconnect (PCI) bus standard or the Universal Serial Bus (USB) standard, for example. In some embodiments, the function of I/O interface 1530 may be split into two or more separate components, such as a north bridge and a south bridge, for example. In addition, in some embodiments some or all of the functionality of I/O interface 1530, such as an interface to system memory 1520, may be incorporated directly into processor 1510.

Network interface 1540 may be configured to allow data to be exchanged between computer system 1500 and other devices attached to a network, such as other computer systems, or between nodes of computer system 1500. In various embodiments, network interface 1540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1550 may, in some embodiments, include one or more display terminals, keyboards, keypads, touchpads, scanning devices, voice or optical recognition devices, or any other devices suitable for entering or retrieving data by one or more computer system 1500. Multiple input/output devices 1550 may be present in computer system 1500 or may be distributed on various nodes of computer system 1500. In some embodiments, similar input/output devices may be separate from computer system 1500 and may interact with one or more nodes of computer system 1500 through a wired or wireless connection, such as over network interface 1540.

As shown in FIG. 15, memory 1520 may include program instructions 1526, configured to implement embodiments of a procedural modeling tool as described herein, and data storage 1536, comprising various data accessible by program instructions 1526. In one embodiment, program instructions 1526 may include software elements of embodiments of a procedural modeling tool as illustrated in the above Figures. Data storage 1536 may include data that may be used in embodiments, for example a library of procedural models and/or procedural model components such as modules and methods. In other embodiments, other or different software elements and data may be included.

Those skilled in the art will appreciate that computer system 1500 is merely illustrative and is not intended to limit the scope of a procedural modeling tool as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1500 may be transmitted to computer system 1500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method comprising:
    selecting, in response to a user input, two or more modules from a procedural model library, each module being described by an array of values for parameters of the module and specifying a sequence of one or more methods that modify a state of each module;
    specifying a hierarchy comprising the two or more selected modules to construct a procedural model, at least one module of the two or more selected modules specifying a geometry to be drawn according to the methods of the at least one module; and
    executing the constructed procedural model to draw a graphical structure comprising one or more geometries specified by the two or more selected modules, said executing the constructed procedural model comprising:
        executing the two or more selected modules according to the specified hierarchy, said executing the two or more selected modules comprising:
            sequentially executing the one or more methods of each module, said sequentially executing being controlled by one or more curves that control one or more parameters of each method related to drawing the graphical structure.

2. The method as recited in claim 1, wherein the procedural model library includes other procedural models, modules, and methods.

3. The method as recited in claim 1, further comprising obtaining input specifying the values for the parameters.

4. The method as recited in claim 3, wherein said input specifying at least one of the values is a curve drawn on a graphical user interface or a file specifying a curve.

5. The method as recited in claim 1, wherein said specifying the hierarchy comprises obtaining input for an interpolated procedural model specifying an interpolation between two other procedural models.

6. The method as recited in claim 5, wherein the two other procedural models are selected from a library of pre-existing procedural models.

7. The method as recited in claim 5, further comprising applying an interpolation technique to the two other procedural models to generate the interpolated procedural model, wherein said applying the interpolation technique comprises:
comparing modules of the two other procedural models to determine matched modules in the two other procedural models;
aligning the methods in the matched modules; and
interpolating values of parameters for methods of the matched modules to generate interpolated values for the parameters in the interpolated procedural model.

8. The method as recited in claim 7, wherein, in said comparing modules of the two other procedural models to determine the matched modules in the two other procedural models, the method comprises minimizing a cost function for matching the modules.

9. The method as recited in claim 7, wherein, in said applying the interpolation technique to the two other procedural models to generate the interpolated procedural model, the method comprises maintaining an order of the methods from the two other procedural models in the interpolated procedural model.

10. A system, comprising:
at least one processor;
a display device; and
a memory comprising program instructions, the program instructions executable by the at least one processor to:
select, in response to a user input, two or more modules from a procedural model library, each module being described by an array of values for parameters of the module and specifying a sequence of one or more methods that modify a state of each module;
specify a hierarchy comprising the two or more selected modules to construct a procedural model, at least one module of the two or more modules specifying a geometry to be drawn according to the methods of the at least one module; and
execute the constructed procedural model to draw a graphical structure to the display device, the graphical structure comprising one or more geometries specified by the two or more selected modules, the program instructions further executable by the at least one processor to:
execute the two or more selected modules according to the specified hierarchy; and
sequentially execute the one or more methods of each module, said sequential execution being controlled by one or more curves that control one or more parameters of each method related to drawing the graphical structure.

11. The system as recited in claim 10, wherein the procedural model library includes other procedural models, modules, and methods; and
the program instructions are executable by the at least one processor to:
obtain additional input specifying the values for the parameters.

12. The system as recited in claim 10, wherein to specify the hierarchy, the program instructions are executable by the at least one processor to obtain input for an interpolated procedural model specifying an interpolation between two other procedural models.

13. The system as recited in claim 12, wherein, to generate the interpolated procedural model, the program instructions are executable by the at least one processor to apply an interpolation technique to the two other procedural models, wherein, to apply the interpolation technique, the program instructions are executable by the at least one processor to:
compare modules of the two other procedural models to determine matched modules in the two other procedural models;
align the methods in the matched modules; and
interpolate values of parameters for methods of the matched modules to generate interpolated values for the parameters in the interpolated procedural model.

14. The system as recited in claim 13, wherein, to compare modules of the two other procedural models to determine the matched modules in the two other procedural models, the program instructions are executable by the at least one processor to minimize a cost function for matching the modules.

15. One or more computer-readable storage memories comprising program instructions stored thereon, the program instructions being computer-executable to implement operations comprising:
selecting, in response to a user input, two or more modules from a procedural model library, each module being described by an array of values for parameters of the module and specifying a sequence of one or more methods that modify a state of each module;
specifying a hierarchy comprising the two or more selected modules to construct a procedural model, at least one module of the two or more selected modules specifying a geometry to be drawn by the procedural model according to the methods of the at least one module; and
executing the constructed procedural model to draw a graphical structure comprising one or more geometries specified by the two or more selected modules, said executing the constructed procedural model comprising:
executing the two or more selected modules according to the specified hierarchy, said executing the two or more selected modules comprising:
sequentially executing the one or more methods of each module, said sequentially executing being controlled by one or more curves that control one or more parameters of each method related to drawing the graphical structure.

16. The computer-readable storage memories as recited in claim 15, wherein, the procedural model library includes other procedural models, modules, and methods, and the program instructions are computer-executable being further executable to implement:
obtaining additional input specifying at least one of the values for the parameters.

17. The computer-readable storage memories as recited in claim 15, the program instructions for the specifying the hierarchy being further executable to implement obtaining input for an interpolated procedural model specifying an interpolation between two other procedural models.

18. The computer-readable storage memories as recited in claim 17, the program instructions being further executable to implement:
applying an interpolation technique to the two other procedural models to generate the interpolated procedural model, said applying the interpolation technique comprising:

comparing modules of the two other procedural models to determine matched modules in the two other procedural models;
aligning the methods in the matched modules; and
interpolating values of parameters for methods of the matched modules to generate interpolated values for the parameters in the interpolated procedural model.

19. The computer-readable storage memories as recited in claim 18, wherein, the comparing modules of the two other procedural models to determine the matched modules in the two other procedural models, the program instructions are executable to implement minimizing a cost function for matching the modules.

20. The computer-readable storage memories as recited in claim 18, wherein, in said applying the interpolation technique to the two other procedural models to generate the interpolated procedural model, the program instructions are executable to implement maintaining an order of the methods from the two other procedural models in the interpolated procedural model.

* * * * *